US012477611B2

(12) United States Patent
Qu et al.

(10) Patent No.: US 12,477,611 B2
(45) Date of Patent: Nov. 18, 2025

(54) COMMUNICATION METHOD AND APPARATUS

(71) Applicant: Huawei Technologies Co., Ltd., Shenzhen (CN)

(72) Inventors: Kaiyang Qu, Hangzhou (CN); Xiaoying Xu, Shenzhen (CN); Qiang Fan, Shanghai (CN); Feng Han, Shanghai (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 338 days.

(21) Appl. No.: 18/056,938

(22) Filed: Nov. 18, 2022

(65) Prior Publication Data

US 2023/0077500 A1    Mar. 16, 2023

Related U.S. Application Data

(63) Continuation of application No. PCT/CN2021/095326, filed on May 21, 2021.

(30) Foreign Application Priority Data

May 21, 2020   (CN) .......................... 202010437695.5

(51) Int. Cl.
*H04W 76/20*    (2018.01)
*H04W 72/20*    (2023.01)

(52) U.S. Cl.
CPC ........... *H04W 76/20* (2018.02); *H04W 72/20* (2023.01)

(58) Field of Classification Search
CPC .............................. H04W 76/20; H04W 72/20
See application file for complete search history.

(56) References Cited

U.S. PATENT DOCUMENTS

| 10,764,948 | B2* | 9/2020 | Park | H04L 5/001 |
| 2016/0183158 | A1* | 6/2016 | Decarreau | H04W 28/0205 |
| | | | | 370/328 |
| 2020/0162211 | A1* | 5/2020 | Wang | H04L 5/0091 |
| 2021/0211932 | A1* | 7/2021 | Lu | H04L 1/1896 |
| 2021/0352525 | A1* | 11/2021 | Hong | H04L 1/1614 |

(Continued)

FOREIGN PATENT DOCUMENTS

| CN | 110167067 A | 8/2019 |
| CN | 110972205 A | 4/2020 |

(Continued)

OTHER PUBLICATIONS

ZTE, "Consideration on UL PDCP duplication", 3GPP TSG-RAN WG3 #108-e, R3-203174, Jun. 1-12, 2020, 7 pages, Online.
3rd Generation Partnership Project; Technical Specification Group Radio Access Network; NG-RAN; F1 application protocol (F1AP) (Release 15), 3GPP TS 38.473, Mar. 2020, 222 Pages, V15.9.0.

(Continued)

*Primary Examiner* — Shean Tokuta
(74) *Attorney, Agent, or Firm* — Slater Matsil, LLP

(57) ABSTRACT

Embodiments of this application provide a data transmission method and an apparatus. When more than two radio link control RLC entities are configured for one radio bearer RB, a secondary network device receives indication information from a master network device. The secondary network device may determine, based on the indication information, a master RLC entity associated with the radio bearer, to indicate, to a terminal device, RLC entities that need to be activated and deactivated.

20 Claims, 9 Drawing Sheets

(56) References Cited

U.S. PATENT DOCUMENTS

| | | | |
|---|---|---|---|
| 2022/0015172 A1* | 1/2022 | Xu | H04L 5/0053 |
| 2022/0279620 A1* | 9/2022 | Rugeland | H04W 76/34 |
| 2023/0067164 A1* | 3/2023 | Liu | H04W 72/21 |
| 2024/0072935 A1* | 2/2024 | Hong | H04L 5/0094 |
| 2024/0107538 A1* | 3/2024 | Wang | H04W 76/12 |
| 2024/0179783 A1* | 5/2024 | Sha | H04W 8/186 |

FOREIGN PATENT DOCUMENTS

| | | | | | |
|---|---|---|---|---|---|
| CN | 113709908 | A | * | 11/2021 | H04L 1/08 |
| EP | 3937590 | A1 | * | 1/2022 | H04L 5/0048 |
| TW | 202046816 | A | * | 12/2020 | H04L 1/1614 |
| WO | 2015008966 | A1 | | 1/2015 | |
| WO | WO-2020060234 | A1 | * | 3/2020 | H04L 1/1614 |
| WO | WO-2020063438 | A1 | * | 4/2020 | H04L 1/18 |
| WO | WO-2021161433 | A1 | * | 8/2021 | |
| WO | WO-2021233445 | A1 | * | 11/2021 | H04L 1/08 |

OTHER PUBLICATIONS

3rd Generation Partnership Project; Technical Specification Group Radio Access Network; NR; Medium Access Control (MAC) protocol specification (Release 16), 3GPP TS 38.321, Mar. 2020, 141 Pages, V16.0.0.

3rd Generation Partnership Project; Technical Specification Group Radio Access Network; NR; Radio Resource Control (RRC) protocol specification (Release 16), 3GPP TS 38.331, Mar. 2020, 835 Pages, V16.0.0.

3rd Generation Partnership Project; Technical Specification Group Radio Access Network; NG-RAN; Xn application protocol (XnAP) (Release 16), 3GPP TS 38.423, Mar. 2020, 334 Pages, V16.1.0.

Huawei., (TP for NR_IIOT BL CR for TS 38.423): PDCP duplication with more than 2 entities, 3GPP TSG-RAN3 Meeting #107b-e, R3-202321, Apr. 20-30, 2020, 28 pages, E-Meeting.

CMCC, Dynamic control of PDCP duplication, 3GPP TSG-RAN3 Meeting #107bis-e, R3-202437, Apr. 20-30, 2020, 5 Pages, Online.

* cited by examiner

COMMUNICATION METHOD AND APPARATUS

CROSS-REFERENCE TO RELATED APPLICATIONS

This application is a continuation of International Application No. PCT/CN2021/095326, filed on May 21, 2021, which claims priority to Chinese Patent Application No. 202010437695.5, filed on May 21, 2020. The disclosures of the aforementioned applications are hereby incorporated by reference in their entireties.

TECHNICAL FIELD

Embodiments of this application relate to the wireless communications field, and in particular, to a data transmission method and an apparatus.

BACKGROUND

Compared with a 4th generation (4G) mobile communication system, a significant feature of a 5th generation (5G) mobile communication system is that an ultra-reliable and low-latency communication (URLLC) service is additionally supported. There are a plurality of types of URLLC services. Typical examples include industrial control, self driving, remote surgery, a smart grid, and the like. For the URLLC service, a typical requirement is that reliability of sending 32-byte data within 1 millisecond (ms) needs to reach 99.999%. It should be noted that, the foregoing performance indicator is merely an example, and different URLLC services may have different requirements on reliability. For example, in some extremely demanding industrial control application scenarios, a probability of successfully transmitting URLLC service data needs to reach 99.9999999% within 0.25 ms.

SUMMARY

This application provides a data transmission method and an apparatus, to improve data transmission reliability.

According to a first aspect, this application provides a data transmission method. The method is performed by a secondary network device or a module in a secondary network device. An example in which the method is performed by the secondary network device is used herein for description. The secondary network device receives first indication information from a master network device, where the first indication information indicates a master radio link control RLC entity of a first radio bearer RB, and the first RB is associated with one master RLC entity and a maximum of three secondary RLC entities. The secondary network device sends second indication information with a length of 3 bits to a terminal device, where the second indication information indicates a status of each secondary RLC entity associated with the first RB, and different secondary RLC entities associated with the first RB correspond to different bits in the 3 bits.

Through implementation of the method described in the first aspect, when more than two RLC entities (or logical channels) are configured for one RB, the secondary network device receives indication information from the master network device. The secondary network device may determine, based on the indication information, a master RLC entity associated with the radio bearer, to accurately indicate, to the terminal device, RLC entities that need to be activated and deactivated, thereby improving data transmission reliability.

In a possible implementation of the first aspect, the secondary network device receives configuration information from the master network device, where the configuration information indicates M RLC entities associated with the first RB in the secondary network device, and M is 1, 2, or 3.

In a possible implementation of the first aspect, that the first indication information indicates a master radio link control RLC entity of a first radio bearer RB specifically includes: The first indication information indicates whether there is the master RLC entity of the first RB in the M RLC entities. Alternatively, the first indication information indicates a quantity of secondary RLC entities of the first RB in the M RLC entities. Alternatively, the first indication information indicates whether there is the master RLC entity of the first RB in an RLC entity associated with the first RB in the master network device. Alternatively, the first indication information indicates initial statuses of X secondary RLC entities in the M RLC entities, where X is 0, 1, 2, or 3.

In a possible implementation of the first aspect, the secondary network device receives third indication information from the master network device, where the third indication information indicates a quantity of RLC entities associated with the first RB in the master network device. Alternatively, the third indication information indicates identifiers of all RLC entities associated with the first RB in the master network device. Alternatively, the third indication information indicates a quantity of secondary RLC entities associated with the first RB in the master network device. Alternatively, the third indication information indicates identifiers of all secondary RLC entities associated with the first RB in the master network device.

In a possible implementation of the first aspect, that the first indication information indicates a master radio link control RLC entity of a first radio bearer RB specifically includes: The first indication information indicates whether each RLC entity associated with the first RB in the master network device is the master RLC entity of the first RB.

In a possible implementation of the first aspect, that the first indication information indicates a master radio link control RLC entity of a first radio bearer RB specifically includes: The first indication information indicates the quantity of RLC entities associated with the first RB in the master network device, and the quantity of secondary RLC entities associated with the first RB in the master network device.

In a possible implementation of the first aspect, that the first indication information further indicates the master RLC entity of the first RB specifically includes: The first indication information indicates an initial status of each secondary RLC entity associated with the first RB in the master network device, and the quantity of RLC entities associated with the first RB in the master network device.

In a possible implementation of the first aspect, when the master RLC entity associated with the first RB is located in the secondary network device, the secondary network device sends fourth indication information to the master network device, where the fourth indication information indicates an identifier of the master RLC entity associated with the first RB.

According to a second aspect, this application provides a data transmission method. The method is performed by a master network device or a module in a master network device. An example in which the method is performed by the master network device is used herein for description. The master network device sends first indication information to a secondary network device, where the first indication information indicates a master radio link control RLC entity of a first radio bearer RB, and the first RB is associated with one master RLC entity and a maximum of three secondary RLC entities. The master network device sends fifth indication information to a terminal device, where the fifth indication information indicates the master RLC entity of the first RB.

In a possible implementation of the second aspect, the master network device sends configuration information to the secondary network device, where the configuration information indicates M RLC entities associated with the first RB in the secondary network device, and M is 1, 2, or 3.

In a possible implementation of the second aspect, that the first indication information indicates a master radio link control RLC entity of a first radio bearer RB specifically includes: The first indication information indicates whether there is the master RLC entity of the first RB in the M RLC entities. Alternatively, the first indication information indicates a quantity of secondary RLC entities of the first RB in the M RLC entities. Alternatively, the first indication information indicates whether there is the master RLC entity of the first RB in an RLC entity associated with the first RB in the master network device. Alternatively, the first indication information indicates initial statuses of X secondary RLC entities in the M RLC entities, where X is 0, 1, 2, or 3.

In a possible implementation of the second aspect, the master network device sends third indication information to the secondary network device, where the third indication information indicates a quantity of RLC entities associated with the first RB in the master network device. Alternatively, the third indication information indicates identifiers of all RLC entities associated with the first RB in the master network device. Alternatively, the third indication information indicates a quantity of secondary RLC entities associated with the first RB in the master network device. Alternatively, the third indication information indicates identifiers of all secondary RLC entities associated with the first RB in the master network device.

In a possible implementation of the second aspect, that the first indication information indicates a master radio link control RLC entity of a first radio bearer RB specifically includes: The first indication information indicates whether each RLC entity associated with the first RB in the master network device is the master RLC entity of the first RB.

In a possible implementation of the second aspect, that the first indication information indicates a master radio link control RLC entity of a first radio bearer RB specifically includes: The first indication information indicates the quantity of RLC entities associated with the first RB in the master network device, and the quantity of secondary RLC entities associated with the first RB in the master network device.

In a possible implementation of the second aspect, that the first indication information further indicates the master RLC entity of the first RB specifically includes: The first indication information indicates an initial status of each secondary RLC entity associated with the first RB in the master network device, and the quantity of RLC entities associated with the first RB in the master network device.

In a possible implementation of the second aspect, when the master RLC entity associated with the first RB is located in the secondary network device, the master network device receives fourth indication information from the secondary network device, where the fourth indication information indicates an identifier of the master RLC entity associated with the first RB.

According to a third aspect, a communication apparatus is provided. The communication apparatus includes a functional module configured to implement the method according to any one of the first aspect or the possible implementations of the first aspect.

According to a fourth aspect, a communication apparatus is provided. The communication apparatus includes a functional module configured to implement the method according to any one of the second aspect or the possible implementations of the second aspect.

According to a fifth aspect, a communication apparatus is provided. The communication apparatus includes a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement the method according to any one of the first aspect or the possible implementations of the first aspect through a logic circuit or executing code instructions.

According to a sixth aspect, a communication apparatus is provided. The communication apparatus includes a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement the method according to any one of the second aspect or the possible implementations of the second aspect through a logic circuit or executing code instructions.

According to a seventh aspect, a computer-readable storage medium is provided. The computer-readable storage medium stores a computer program or instructions. When the computer program or the instructions are executed, the method according to any one of the first aspect or the possible implementations of the first aspect is implemented.

According to an eighth aspect, a computer-readable storage medium is provided. The computer-readable storage medium stores a computer program or instructions. When the computer program or the instructions are executed, the method according to any one of the second aspect or the possible implementations of the second aspect is implemented.

According to a ninth aspect, a computer program product including instructions is provided. When the instructions are run, the method according to any one of the first aspect or the possible implementations of the first aspect is implemented.

According to a tenth aspect, a computer program product including instructions is provided. When the instructions are run, the method according to any one of the second aspect or the possible implementations of the second aspect is implemented.

According to an eleventh aspect, a computer program is provided. The computer program includes code or instructions. When the code or the instructions are run, the method according to any one of the first aspect or the possible implementations of the first aspect is implemented.

According to a twelfth aspect, a computer program is provided. The computer program includes code or instructions. When the code or the instructions are run, the method according to any one of the second aspect or the possible implementations of the second aspect is implemented.

According to a thirteenth aspect, a chip system is provided. The chip system includes a processor, may further include a memory, and is configured to implement at least one method described in the first aspect and the second aspect. The chip system may include a chip, or may include a chip and another discrete component.

According to a fourteenth aspect, a communication system is provided. The system includes the apparatus (for example, a secondary network device) described in the third aspect or the fifth aspect, and the apparatus (for example, a master network device) described in the fourth aspect or the sixth aspect.

DETAILED DESCRIPTION OF ILLUSTRATIVE EMBODIMENTS

Figure 1A:
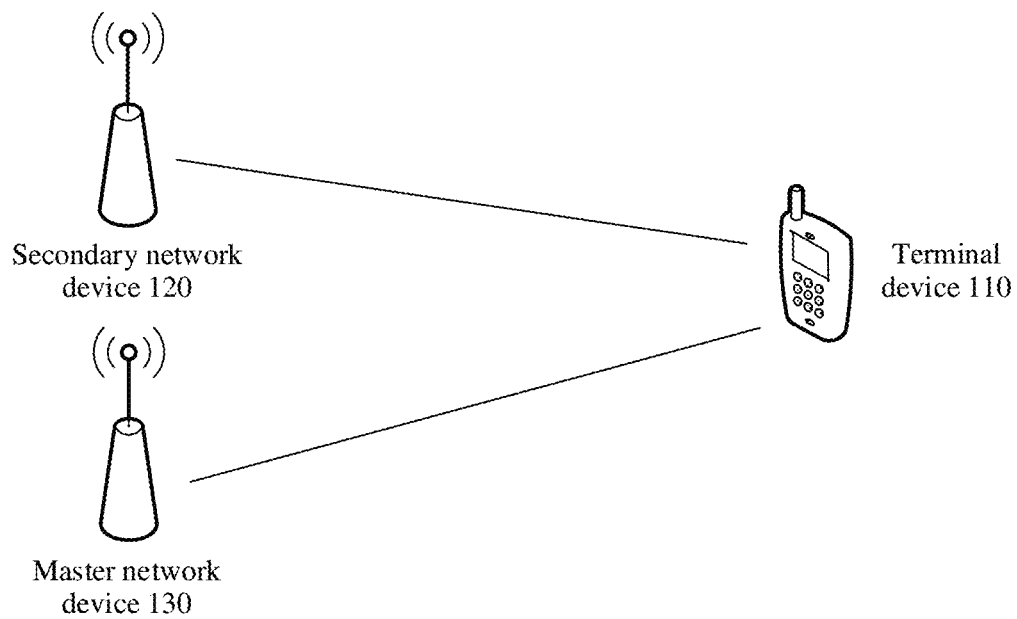
FIG. 1A is a schematic diagram of an architecture of a communication system to which embodiments of this application are applied.

Technical solutions provided in embodiments of this application may be applied to various communication systems, for example, a long term evolution (LTE) system, a 5th generation (5G) mobile communication system, a Wi-Fi system, a future communication system, a system integrating a plurality of communication systems, or the like. This is not limited in embodiments of this application. 5G may also be referred to as new radio (NR).

The technical solutions provided in embodiments of this application may be applied various communication scenarios, for example, may be applied to one or more of the following communication scenarios: enhanced mobile broadband (eMBB), ultra-reliable low-latency communication (URLLC), machine type communication (MTC), massive machine type communications (mMTC), device-to-device (D2D), vehicle to everything (V2X), vehicle to vehicle (V2V), internet of things (IoT), and the like.

The technical solutions provided in embodiments of this application may be applied to communication between communication devices. The communication between the communication devices may include communication between a network device and a terminal device, communication between network devices, and/or communication between terminal devices. In embodiments of this application, the term "communication" may also be described as "transmission", "information transmission", "signal transmission", or the like. The transmission may include sending and/or receiving. In embodiments of this application, the communication between the network device and the terminal device is used as an example to describe the technical solutions. A person skilled in the art may also apply the technical solutions to other communication between a scheduling entity and a subordinate entity, for example, communication between a macro base station and a micro base station, for example, communication between a first terminal device and a second terminal device. The scheduling entity may allocate an air interface resource to the subordinate entity. The air interface resources include one or more of the following resources: a time domain resource, a frequency domain resource, a code resource, and a spatial resource. In embodiments of this application, "a plurality of types" may be two types, three types, four types, or more types. This is not limited in embodiments of this application.

In embodiments of this application, the communication between the network device and the terminal device includes: The network device sends a downlink signal/downlink information to the terminal device, and/or the terminal device sends an uplink signal/uplink information to the network device.

In embodiments of this application, "/" may represent an "or" relationship between associated objects. For example, A/B may represent A or B. "and/or" may be used to indicate that there are three relationships between the associated objects. For example, A and/or B may represent the following three cases: Only A exists, both A and B exist, and only B exists. A and B may be singular or plural. In embodiments of this application, terms such as "first" or "second" may be used to distinguish between technical features with a same or similar function. The terms such as "first" or "second" do not limit a quantity and an execution sequence, and the terms such as "first" or "second" do not indicate a definite difference. In embodiments of this application, terms such as "example" or "for example" are used to represent giving an example, an illustration, or a description. Any embodiment or design scheme described with "example" or "for example" should not be explained as being more preferred or having more advantages than another embodiment or design scheme. Use of the terms such as "example" or "for example" is intended to present a related concept in a specific manner for ease of understanding.

FIG. 1A is a schematic diagram of an architecture of a communication system to which embodiments of this application may be applied. As shown in FIG. 1A, the communication system includes one terminal device 110 and two network devices (for example, a secondary network device 120 and a master network device 130 in FIG. 1A). FIG. 1A is merely a schematic diagram. Quantities of network devices and terminal devices included in the communication system are not limited in this embodiment of this application.

The terminal device in embodiments of this application may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application. In embodiments of this application, an apparatus configured to implement a function of the terminal device may be a terminal device, or may be an apparatus, for example, a chip system, that can support the terminal device in implementing the function. The apparatus may be deployed in the terminal device, or may be used together with the terminal device. In embodiments of this application, the chip system may include a chip, or may include a chip and another discrete component. The technical solutions provided in embodiments of this application are described by using an example in which the apparatus configured to implement the function of the terminal device is the terminal device.

The network device in embodiments of this application is an access device used by the terminal device to access the mobile communication system in a wireless manner, and may be a base station, an evolved NodeB (eNodeB), a transmission reception point (TRP), a next generation NodeB (gNB) in a 5G mobile communication system, a base station in a future mobile communication system, an access node in a Wi-Fi system, or the like; or may be a module or a unit that completes a part of functions of a base station.

Communication between the network device and the terminal device complies with a protocol layer structure. For example, a control plane protocol layer structure may include functions of protocol layers such as an RRC layer, a packet data convergence protocol (PDCP) layer, a radio link control (RLC) layer, a media access control (MAC) layer, and a physical layer; and a user plane protocol layer structure may include the functions of the protocol layers such as the PDCP layer, the RLC layer, the MAC layer, and the physical layer. In a possible implementation, a service data adaptation protocol (SDAP) layer may be further included above the PDCP layer.

Figure 1B:
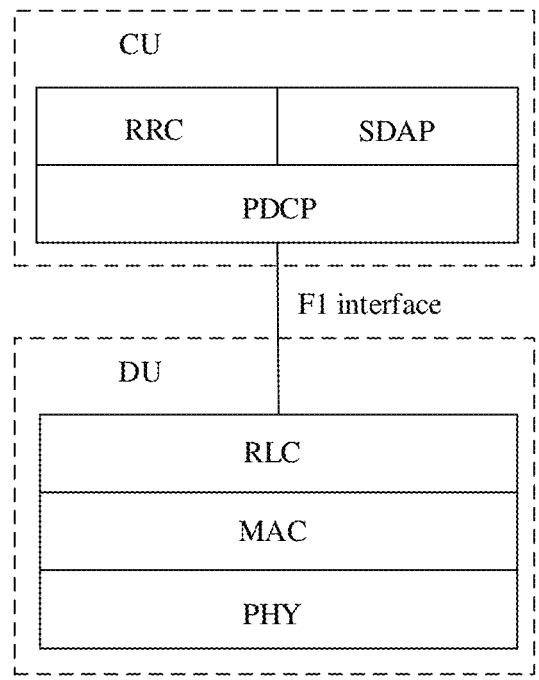
FIG. 1B is a schematic diagram of split CU-DU to which embodiments of this application are applied.

The network device may include a central unit (CU) and a distributed unit (DU). An interface between the CU and the DU may be referred to as an F1 interface, which is shown in FIG. 1B. A control plane (CP) interface may be an F1-C, and a user plane (UP) interface may be an F1-U. The CU and the DU may be obtained through division based on protocol layers of a wireless network. For example, functions of a PDCP layer and a protocol layer above the PDCP layer are set on the CU, and a function of a protocol layer (for example, an RLC layer and a MAC layer) below the PDCP layer is set on the DU. Signalling generated by the CU may be sent to the terminal device through the DU, or signalling generated by the terminal device may be sent to the CU through the DU. The DU may transparently transmit the signalling to the terminal device or the CU by directly encapsulating the signalling at a protocol layer without parsing the signalling. A specific technology and a specific device form that are used by the network device are not limited in embodiments of this application. In embodiments of this application, an apparatus configured to implement a function of the network device may be a network device, or may be an apparatus, for example, a chip system, that can support the network device in implementing the function. The apparatus may be deployed in the network device, or may be used together with the network device. In embodiments of this application, an example in which the apparatus configured to implement the function of the network device is the network device is used to describe the technical solutions provided in embodiments of this application.

The network device and the terminal device may be deployed on land, where the deployment includes indoor or outdoor, or handheld or vehicle-mounted deployment, may be deployed on water, or may be deployed on an airplane, a balloon, or an artificial satellite in the air. An application scenario of the network device and the terminal device is not limited in embodiments of this application. The communication between the network device and the terminal device may be performed on a licensed spectrum, may be performed on an unlicensed spectrum, or may be performed on both a licensed spectrum and an unlicensed spectrum. The communication between the network device and the terminal device may be performed on a spectrum below 6 gigahertz (GHz), may be performed on a spectrum above 6 GHz, or may be performed on both a spectrum below 6 GHz and a spectrum above 6 GHz. A spectrum resource used between the network device and the terminal device is not limited in embodiments of this application.

In embodiments of this application, dual connectivity (DC) means: A terminal device is connected to two network devices at the same time. The two network devices to which the terminal device is connected may be base stations in a same radio access technology. For example, the base stations are both base stations in an LTE communication system or a 5G mobile communication system. Alternatively, the two base stations to which the terminal device is connected may be base stations in different radio access technologies. For example, one base station is a base station in an LTE communication system, and the other base station is a base station in a 5G mobile communication system.

In embodiments of this application, carrier aggregation (CA) means: A plurality of component carriers (CCs) are aggregated to provide a service for one terminal device, to implement a larger transmission bandwidth, so that uplink and downlink transmission rates are increased.

Data may be transmitted between the terminal device and the network device through setting up at least one radio bearer (RB). The radio bearer may be classified into a signalling radio bearer (SRB) for transmitting signalling data and a data radio bearer (DRB) for transmitting service data. A functional entity set corresponding to a same radio bearer includes one packet data convergence protocol (PDCP) entity, at least one radio link control (RLC) entity corresponding to the PDCP entity, and at least one medium access control (MAC) entity corresponding to the at least one RLC entity. The PDCP entity is located at a PDCP layer, the RLC entity is located at an RLC layer, and the MAC entity is located at a MAC layer.

In embodiments of this application, PDCP layer duplication transmission means: A plurality of same packets (namely, duplication packets) are obtained, at a PDCP layer, through duplication performed on a data packet of a radio bearer, and then the plurality of duplication data packets are separately delivered to a plurality of different RLC entities for transmission, where specifically, each RLC entity transmits a data packet to a MAC layer through a logical channel (LCH) corresponding to the RLC entity. It should be noted that the PDCP layer duplication transmission is different from what is commonly known as retransmission. The retransmission means that a same data packet is transmitted again after transmission fails. The PDCP layer duplication transmission, however, means that a plurality of data packets are obtained through duplication performed on one data packet, and the plurality of data packets are separately transmitted through a plurality of logical channels. In embodiments of this application, the PDCP layer duplication transmission may also be referred to as "PDCP duplication", "PDCP duplication", or "PDCP layer duplication".

In embodiments of this application, the PDCP duplication includes PDCP duplication in a DC scenario (which may also be referred to as DC duplication) and PDCP duplication in a CA scenario (which may also be referred to as CA duplication). The following separately describes how to implement a PDCP duplication function in the DC scenario and the CA scenario.

Figure 2A:
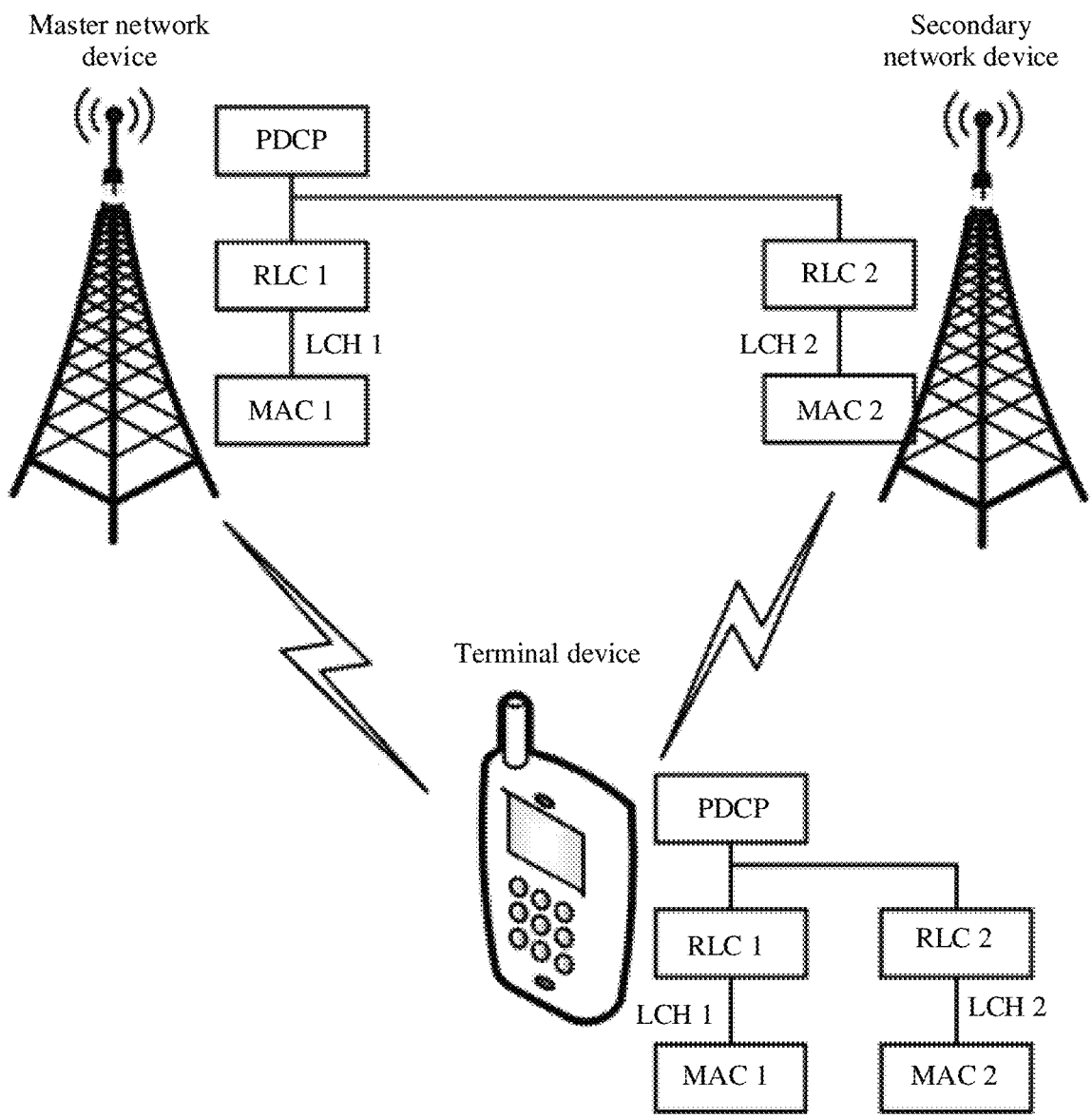
FIG. 2A shows a network architecture related to implementation of PDCP duplication in a DC scenario.

FIG. 2A shows a network architecture for implementation of a PDCP duplication function in a DC scenario. For a network device, the DC scenario involves a master network device and a secondary network device. One RB corresponds to one PDCP entity, one RLC entity, and one MAC entity in the master network device, and corresponds to one RLC entity and one MAC entity in the secondary network device. The RB corresponds to one PDCP entity, two RLC entities, and two MAC entities in a terminal device. For one RB, the master network device may further include an SDAP entity above the PDCP entity, and the terminal device may also further include an SDAP entity above the PDCP entity. In the DC scenario, one terminal device is connected to two network devices at the same time, namely, the master network device and the secondary network device. If the PDCP duplication function is configured for an RB, two same data packets obtained through duplication at a PDCP layer are transmitted to two different RLC entities, and then are separately transmitted to two different MAC entities through different logical channels. Finally, two MAC protocol data units (PDUs) are generated, and are separately transmitted on cell resources scheduled by the two different MAC entities. For the network devices, a PDCP layer in the master network device transmits two data packets obtained through duplication to two different RLC entities, where the two RLC entities are respectively located in the master network device and the secondary network device. Then, the RLC entity in the master network device transmits a received data packet to a MAC entity in the master network device, and the RLC entity in the secondary network device transmits a received data packet to a MAC entity in the secondary network device, where the two MAC entities respectively transmit the data packets by using cell resources of the two MAC entities. However, for the terminal device, two RLC entities and two MAC entities are all located in the terminal device. For example, in the DC scenario, there may be two cell groups that serve the terminal device: a master cell group (MCG) and a secondary cell group (SCG). The master cell group is managed and configured by the master network device, and the secondary cell group is managed and configured by the secondary network device.

Figure 2B:
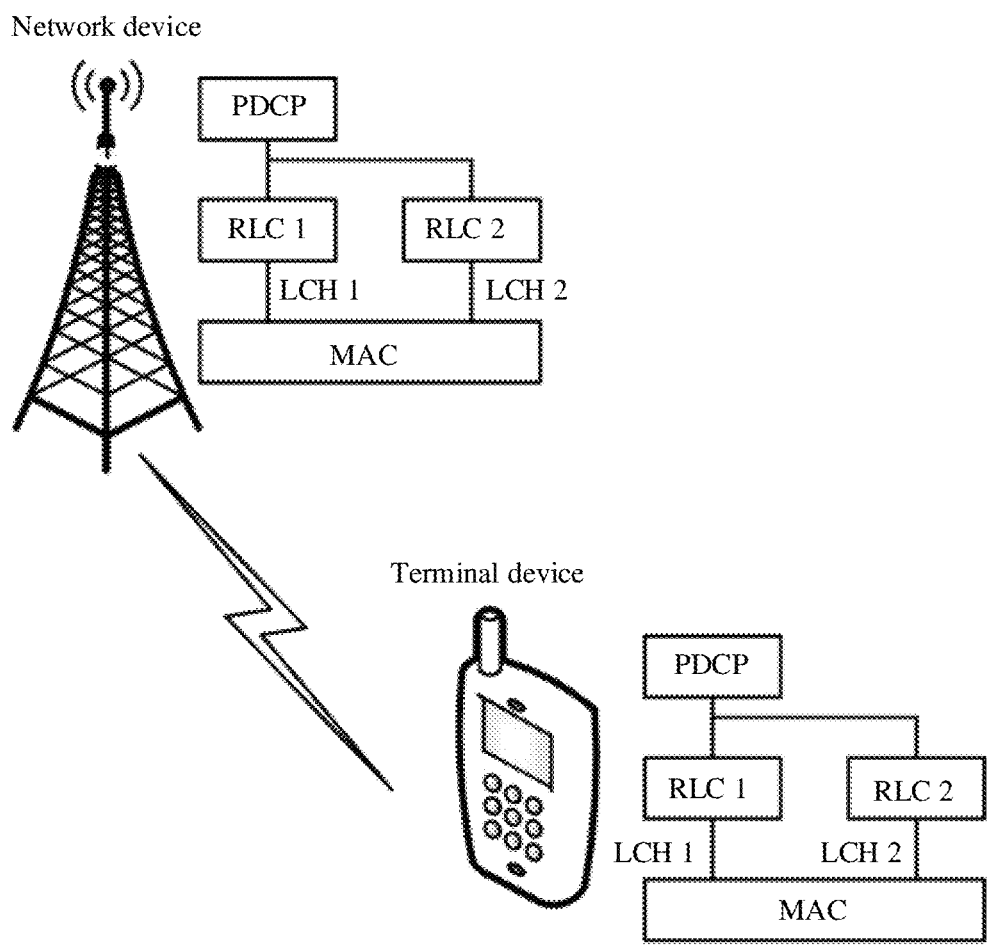
FIG. 2B shows a network architecture related to implementation of PDCP duplication in a CA scenario.

FIG. 2B shows a network architecture for implementation of a PDCP duplication function in a CA scenario. In the CA scenario, one terminal device is connected to one network device, and at least two carriers (or cells) of the single network device serve the terminal device. One RB corresponds to one PDCP entity, two RLC entities, and one MAC entity in the network device. The RB corresponds to one PDCP entity, two RLC entities, and one MAC entity in the terminal device. When the network device configures the PDCP duplication function for the radio bearer, two same data packets obtained through duplication at a PDCP layer are transmitted to two different RLC entities, and then the two RLC entities transmit the data packets to a same MAC entity through different logical channels. In this case, because the two same data packets are transmitted to the same MAC entity, the MAC entity includes the two data packets in one MAC PDU for transmission. Therefore, to enable the two data packets to be separately transmitted through two cells, a parameter may be configured for a logical channel, where the parameter is, for example, referred to as parameter A. A value of parameter A is used to indicate different cells, to ensure that the two same data packets can finally be included in two MAC PDUs for transmission in the different cells, so that reliability is improved.

When configuring the PDCP duplication function for a radio bearer by using radio resource control (RRC) signalling, the network device may indicate whether an initial status of the PDCP duplication function of the radio bearer is an active state or an inactive state. Further, the network device may further configure activation/deactivation of the PDCP duplication function of the radio bearer by using a MAC control element (MAC CE).

Specifically, in the DC scenario shown in FIG. 2A, after a DC duplication function configured for a radio bearer is activated, data packets are obtained through duplication at a PDCP layer and are transmitted through two logical channels; and after a DC duplication function configured for a radio bearer is deactivated, the radio bearer falls back to a DC split bearer. To be specific, the terminal device may separately send different data packets to the master network device and the secondary network device through the two logical channels on the terminal device side, or the terminal device may receive, through the two logical channels on the terminal device side, different data packets respectively from the master network device and the secondary network device.

Figure 3:
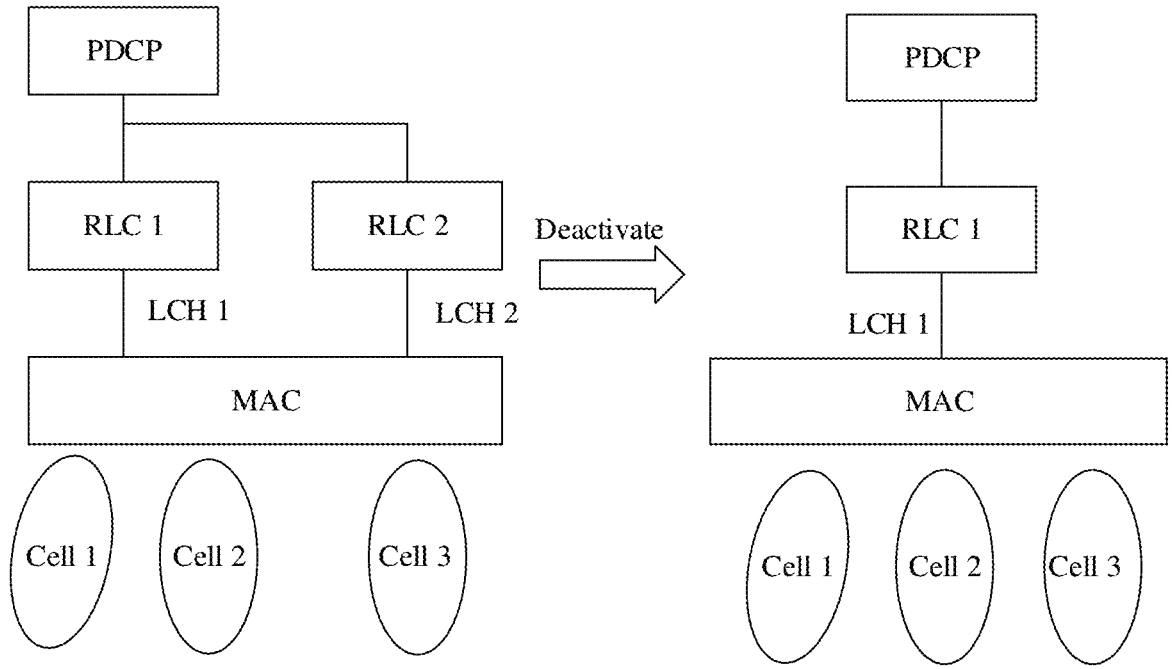
FIG. 3 is a schematic diagram of activating and deactivating PDCP duplication in a CA scenario.

In the CA scenario shown in FIG. 2B, after a CA duplication function configured for a radio bearer is deactivated, an association relationship between a logical channel in the radio bearer and a cell is no longer applicable. Currently, the CA duplication is limited only to one radio bearer using two logical channels to transmit data packets that are obtained through duplication at a PDCP layer (this is also commonly referred to as two-leg duplication transmission). Further, one of the legs may be configured as a primary leg. For example, a leg on which logical channel 1 is located is the primary leg. In embodiments of this application, the primary leg may be a master RLC entity, or may be a logical channel associated with a master RLC entity, which is also referred to as a master logical channel. A secondary leg may be a secondary RLC entity, or may be a logical channel associated with a secondary RLC entity, which is also referred to as a secondary logical channel. As shown in FIG. 3, when a CA duplication function is activated, data from logical channel 1 can be transmitted only in cell 1 or cell 2 (where logical channel 1 is associated with cell 1 and cell 2), and data from logical channel 2 can be transmitted only in cell 3 (where logical channel 2 is associated with cell 3). When the CA duplication function is deactivated, a terminal device can transmit data to a network device only through master logical channel 1. In this case, to increase a transmission capacity, a cell binding relationship configured for logical channel 1 is no longer applicable. In other words, data on logical channel 1 may be transmitted in all cells in which a wireless connection to the terminal device is set up.

Both the DC scenario shown in FIG. 2A and the CA scenario shown in FIG. 2B include PDCP duplication of two logical channels. To further improve reliability, PDCP duplication of more than two logical channels is introduced. For example, data packets obtained through duplication at a PDCP layer may be transmitted through three or four logical channels.

Figure 4A:
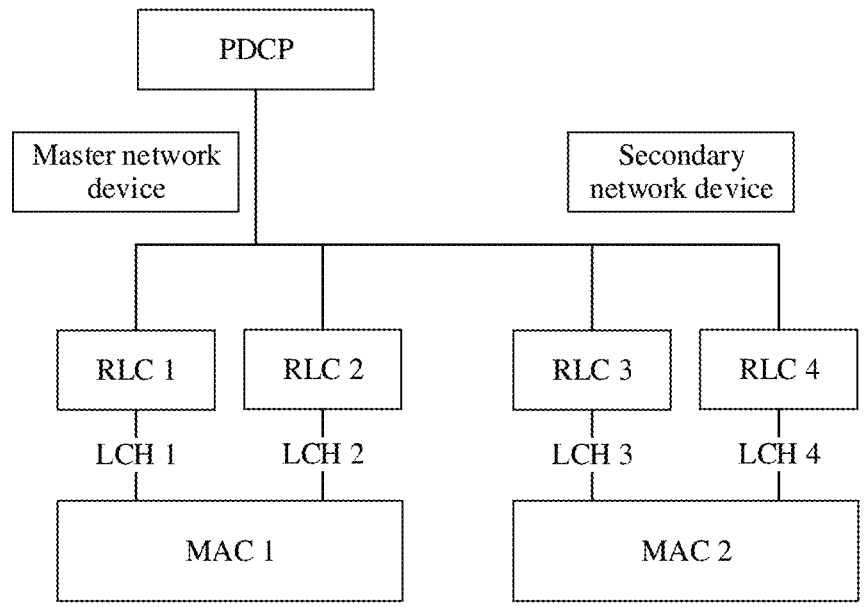
FIG. 4A and FIG. 4B each show a network architecture related to implementation of PDCP duplication in a DC+CA scenario.

FIG. 4A shows a network architecture for implementation of a PDCP duplication function in a DC+CA scenario. As shown in FIG. 4A, one terminal device is connected to a master network device and a secondary network device. There are two carriers (or cells) serving the terminal device under the master network device, and there are two carriers (or cells) serving the terminal device under the secondary network device. One RB corresponds to one PDCP entity, two RLC entities, and one MAC entity in the master network device, and corresponds to two RLC entities and one MAC entity in the secondary network device. Correspondingly, the RB corresponds to one PDCP entity, four RLC entities, and two MAC entities in the terminal device. In this scenario, when the master network device configures the PDCP duplication function for the radio bearer, four same data packets obtained through duplication at a PDCP layer are transmitted to four different RLC entities: RLC 1, RLC 2, RLC 3, and RLC 4. RLC 1 and RLC 2 are respectively transmitted data packets to a same MAC entity, namely, MAC 1, through logical channel 1 and logical channel 2. RLC 3 and RLC 4 are respectively transmitted data packets to a same MAC entity, namely, MAC 2, through logical channel 3 and logical channel 4. In this case, two data packets in the four same data packets are transmitted to MAC 1, and MAC 1 transmits the two data packets on different cells. The other two same data packets are transmitted to MAC 2, and MAC 2 transmits the other two data packets on different cells. That is, the four same data packets are separately transmitted in four different cells, so that data transmission reliability can be further improved. Further, the network device configures a master logical channel and a split secondary logical channel for the radio bearer. The master logical channel is located on the master network device, and the split secondary logical channel is located on the secondary network device. Alternatively, the master logical channel is located on the secondary network device, and the split secondary logical channel is located on the master network device.

When configuring the PDCP duplication function for a radio bearer by using RRC signalling, the master network device or the secondary network device may indicate whether an initial status of the PDCP duplication function of the radio bearer is an active state or an inactive state. Further, the master network device or the secondary network device may further indicate, to the terminal device by using a MAC CE, an active/inactive state of an RLC entity associated with the radio bearer. The terminal device may perform PDCP layer duplication transmission with the network device through an activated RLC entity. After the PDCP duplication function in the DC+CA scenario is deactivated, the terminal device stops PDCP layer duplication transmission. The terminal device may separately send, through a master logical channel and a split secondary logical channel of the terminal device, different data packets to a network device on which the master logical channel is located and a network device on which the split secondary logical channel is located. Alternatively, the terminal device may separately receive, through a master logical channel and a split secondary logical channel of the terminal device, different data packets from a network device on which the master logical channel is located and a network device on which the split secondary logical channel is located.

In the DC+CA scenario, how a master network device and a secondary network device indicate a terminal device to transmit data through at least one RLC entity associated with a radio bearer is a problem to be urgently resolved.

Based on the foregoing problem, embodiments of this application provide a data transmission method. When more than two RLC entities (or logical channels) are configured for a radio bearer, a secondary network device indicates, based on indication information of a master network device, a terminal device to transmit data through at least one RLC entity associated with the radio bearer; or a master network device indicates, based on indication information of a secondary network device, a terminal device to transmit data through at least one RLC entity associated with the radio bearer.

In embodiments of this application, because one RLC entity is associated with one logical channel, and one logical channel is associated with one RLC entity, that a MAC CE configures activation/deactivation of an RLC entity associated with a radio bearer may alternatively be understood as: A MAC CE configures activation/deactivation of a logical channel associated with a radio bearer.

Figure 4B:
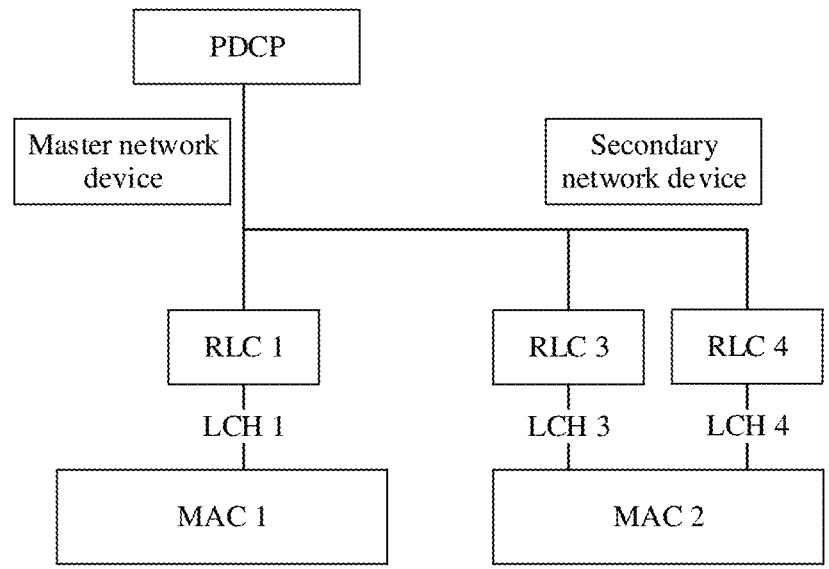
Figure 5:
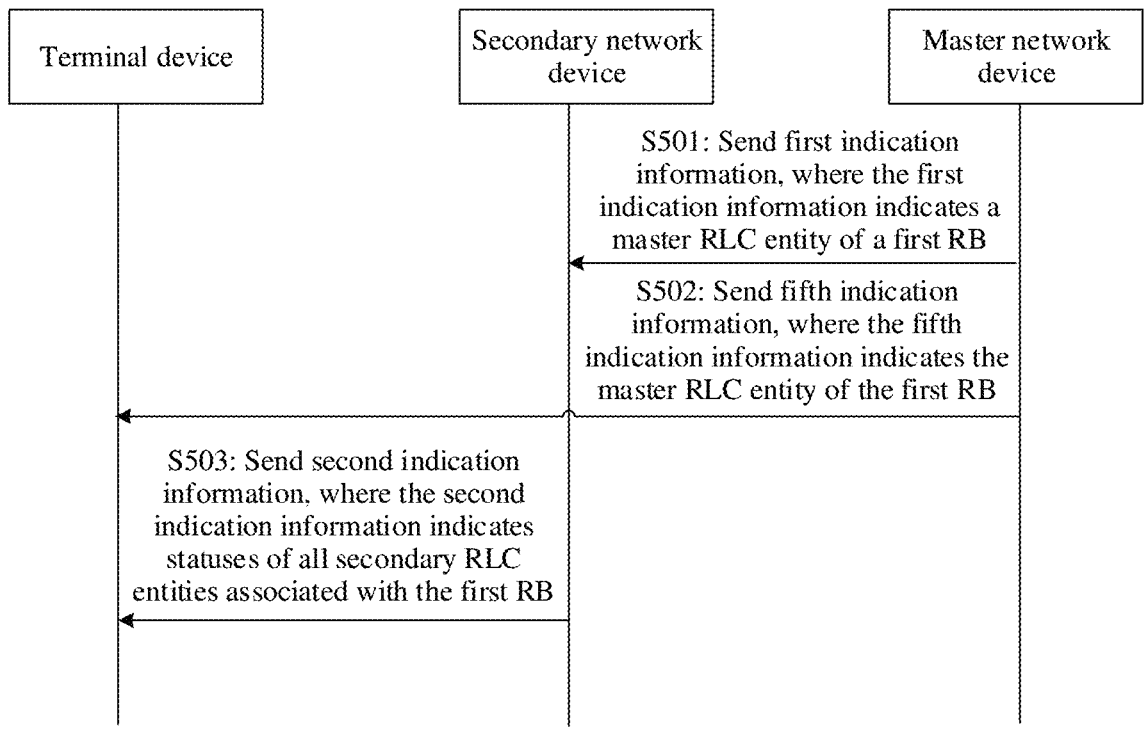
FIG. 5 to FIG. 8 are schematic flowcharts corresponding to data transmission methods according to embodiments of this application.

FIG. 5 is a schematic flowchart of a data transmission method according to an embodiment of this application. This embodiment relates to a specific process of data transmission between a secondary network device, a master network device, and a terminal device. This embodiment relates to a scenario in which a PDCP entity associated with a radio bearer is located in the master network device. FIG. 4A and FIG. 4B are two examples of the scenario. As shown in FIG. 5, the method may include S501, S502, and S503. A sequence of performing S501, S502, and S503 is not limited in this embodiment of this application.

S501: The master network device sends first indication information to the secondary network device. Accordingly, the secondary network device receives the first indication information from the master network device. The first indication information indicates a master RLC entity of a first RB, and the first RB is associated with one master RLC entity and a maximum of three secondary RLC entities. Optionally, the first indication information may be carried in an s-node addition request message or an s-node modification request message.

The secondary network device determines an RLC entity associated with the first RB in the secondary network device. Specifically, the secondary network device receives configuration information from the master network device, where the configuration information indicates M RLC entities associated with the first RB in the secondary network device, and M is 1, 2, or 3. Optionally, the configuration information is carried in the s-node addition request message or the s-node modification request message.

After determining the RLC entity associated with the first RB in the secondary network device, the secondary network device determines the master RLC entity associated with the first RB. In this embodiment of this application, there is only one master RLC entity of the first RB. In other words, the master RLC entity of the first RB is located in the master network device or the secondary network device. A manner in which the first indication information indicates the master RLC entity of the first RB includes any one of the following four manners.

Manner 1: The first indication information indicates whether there is the master RLC entity of the first RB in the M RLC entities.

Specifically, the first indication information includes 1 bit. When a value of the bit is "0", it indicates that there is the master RLC entity of the first RB in the M RLC entities (in other words, the master RLC entity of the first RB is located in the secondary network device); or when a value of the bit is "1", it indicates that there is not the master RLC entity of the first RB in the M RLC entities (in other words, the master RLC entity of the first RB is located in the master network device). Alternatively, when a value of the bit is "1", it indicates that there is the master RLC entity of the first RB in the M RLC entities (in other words, the master RLC entity of the first RB is located in the secondary network device); or when a value of the bit is "0", it indicates that there is not the master RLC entity of the first RB in the M RLC entities (in other words, the master RLC entity of the first RB is located in the master network device).

Manner 2: The first indication information indicates a quantity of secondary RLC entities of the first RB in the M RLC entities.

Specifically, the first indication information includes 2 bits. When a value of the bits is "00", it indicates that the quantity of secondary RLC entities of the first RB in the M RLC entities is 0. When the value of the bits is "01", it indicates that the quantity of secondary RLC entities of the first RB in the M RLC entities is 1. When the value of the bits is "10", it indicates that the quantity of secondary RLC entities of the first RB in the M RLC entities is 2. When the value of the bits is "11", it indicates that the quantity of secondary RLC entities of the first RB in the M RLC entities is 3.

In Manner 2, if the quantity, indicated by the first indication information, of secondary RLC entities of the first RB is less than M, it indicates that the master RLC entity of the first RB is located in the secondary network device; or if the quantity, indicated by the first indication information, of secondary RLC entities of the first RB is equal to M, it indicates that the master RLC entity of the first RB is located in the master network device.

For example, when the secondary network device determines, based on the first indication information, that the quantity of secondary RLC entities of the first RB in the M RLC entities is 1, and if a value of M is 1, it indicates that the master RLC entity of the first RB is located in the master network device; or if a value of M is 2, it indicates that two RLC entities associated with the first RB in the secondary network device are one secondary RLC entity and one master RLC entity, in other words, the master RLC entity of the first RB is located in the secondary network device.

Manner 3: The first indication information indicates whether there is the master RLC entity of the first RB in an RLC entity associated with the first RB in the master network device.

In an optional manner, the first indication information includes 1 bit. When a value of the bit is "0", it indicates that there is the master RLC entity of the first RB in the RLC entity associated with the first RB in the master network device (in other words, the master RLC entity of the first RB is located in the master network device); or when a value of the bit is "1", it indicates that there is not the master RLC entity of the first RB in the RLC entity associated with the first RB in the master network device (in other words, the master RLC entity of the first RB is located in the secondary network device). Alternatively, when a value of the bit is "1", it indicates that there is the master RLC entity of the first RB in the RLC entity associated with the first RB in the master network device (in other words, the master RLC entity of the first RB is located in the master network device); or when a value of the bit is "0", it indicates that there is not the master RLC entity of the first RB in the RLC entity associated with the first RB in the master network device (in other words, the master RLC entity of the first RB is located in the secondary network device).

In another optional manner, when the master RLC entity of the first RB is located in the master network device, the first indication information indicates an index of the master RLC entity of the first RB or an identifier of a logical channel corresponding to the master RLC entity.

Optionally, in Manner 1 to Manner 3, the first indication information further indicates an initial status of each secondary RLC entity associated with the first RB. Specifically, when the first RB is associated with j secondary RLC entities, the first indication information includes j bits, and different secondary RLC entities associated with the first RB correspond to different bits in the j bits, where j is a positive integer, and the foregoing correspondence may be preset. Each bit in the j bits is for indicating that a status of a secondary RLC entity corresponding to the bit is an active state or an inactive state. For example, when a value of any bit is "0", it indicates that an initial status of a secondary RLC entity corresponding to the bit is the inactive state; or when a value of any bit is "1", it indicates that an initial status of a secondary RLC entity corresponding to the bit is the active state. Alternatively, when a value of any bit is "1", it indicates that an initial status of a secondary RLC entity corresponding to the bit is the inactive state; or when a value of any bit is "0", it indicates that an initial status of a secondary RLC entity corresponding to the bit is the active state.

Manner 4: The first indication information indicates initial statuses of X secondary RLC entities in the M RLC entities, where X is 0, 1, 2, or 3. In this embodiment of this application, an initial status of the master RLC entity of the first RB does not need to be indicated.

Specifically, because the initial status of the master RLC entity of the first RB does not need to be indicated, when the first indication information indicates initial statuses of two RLC entities, it indicates that the master RLC entity of the first RB is located in the master network device.

For example, when the first indication information indicates an initial status of one RLC entity, and if a value of M is 1, it indicates that the master RLC entity of the first RB is located in the master network device; or if a value of M is 2, it indicates that the first indication information indicates only an initial status of one of two RLC entities, in other words, the other RLC entity whose initial status is not indicated is the master RLC entity, that is, the master RLC entity of the first RB is located in the secondary network device. When the first indication information does not indicate an initial status of any RLC entity, that is, when X=0, it indicates that the master RLC entity of the first RB is located in the secondary network device.

For example, when the first indication information indicates an initial status of 0 RLC entities, a value of M can only be 1, which indicates that the only one RLC entity associated with the first RB in the secondary network device is the master RLC entity. In other words, the master RLC entity of the first RB is located in the secondary network device.

When the first indication information indicates the master RLC entity of the first RB in any one of the foregoing four manners, the secondary network device may determine, based on the first indication information and the value of M, the quantity of secondary RLC entities associated with the first RB in the secondary network device and a quantity of master RLC entities associated with the first RB in the secondary network device.

Optionally, in the foregoing Manner 1 to Manner 4, the master network device further sends third indication information to the secondary network device. Accordingly, the secondary network device receives the third indication information from the master network device. The third indication information may be carried in an s-node addition request message or an s-node modification request message. The third indication information and the first indication information may be carried in a same message or different messages.

The secondary network device determines, based on the first indication information and the third indication information, quantities of secondary RLCs and master RLCs that are associated with the first RB in the master network device. Specifically, the third indication information indicates any one or more of the following items:
- (a) a quantity of RLC entities associated with the first RB in the master network device;
- (b) identifiers of all RLC entities associated with the first RB in the master network device;
- (c) a quantity of secondary RLC entities associated with the first RB in the master network device;
- (d) identifiers of all secondary RLC entities associated with the first RB in the master network device;
- (e) a quantity of secondary RLC entities associated with the first RB;
- (f) identifiers of all secondary RLC entities associated with the first RB;
- (g) a quantity of RLC entities associated with the first RB; or
- (h) identifiers of all RLC entities associated with the first RB.

When the third indication information indicates the foregoing item a, to be specific, when the third indication information indicates that the quantity of all RLC entities associated with the first RB in the master network device is m (where m=1, 2, or 3), if the first indication information indicates that the master RLC entity of the first RB is located in the secondary network device, the secondary network device may deduce that the first RB is associated with m secondary RLC entities and 0 master RLC entities in the master network device; or if the first indication information indicates that the master RLC entity of the first RB is located in the master network device, the secondary network device may deduce that the first RB is associated with m−1 secondary RLC entities and one master RLC entity in the master network device.

When the third indication information indicates the foregoing item b, to be specific, when the third indication information indicates identifiers of m (where m=1, 2, or 3) RLC entities, if the first indication information indicates that the master RLC entity of the first RB is located in the secondary network device, the secondary network device may deduce that the first RB is associated with m secondary RLC entities and 0 master RLC entities in the master network device; or if the first indication information indicates that the master RLC entity of the first RB is located in the master network device, the secondary network device may deduce that the first RB is associated with m−1 secondary RLC entities and one master RLC entity in the master network device.

When the third indication information indicates the foregoing item c, to be specific, when the third indication information indicates that the quantity of all secondary RLC entities associated with the first RB in the master network device is n (where n=1, 2, or 3), if the first indication information indicates that the master RLC entity of the first RB is located in the secondary network device, the secondary network device may deduce that the first RB is associated with n secondary RLC entities and 0 master RLC entities in the master network device; or if the first indication information indicates that the master RLC entity is located in the master network device, the secondary network device may deduce that the first RB is associated with n secondary RLC entities and one master RLC entity in the master network device.

When the third indication information indicates the foregoing item d, to be specific, when the third indication information indicates identifiers of n secondary RLC entities, if the first indication information indicates that the master RLC entity of the first RB is located in the secondary network device (where in this case, n=1, 2, or 3), the secondary network device may deduce that the first RB is associated with n secondary RLC entities and 0 master RLC entities in the master network device; or if the first indication information indicates that the master RLC entity of the first RB is located in the master network device, the secondary network device may deduce that the first RB is associated with n secondary RLC entities and one master RLC entity in the master network device.

When the third indication information indicates the foregoing item e, to be specific, when the third indication information indicates that the quantity of all secondary RLC entities associated with the first RB in the master network device and the secondary network device is p (where p=2 or 3), if the first indication information indicates that the master RLC entity of the first RB is located in the secondary network device, the secondary network device may deduce that the first RB is associated with p−M+1 secondary RLC entities and 0 master RLC entities in the master network device; or if the first indication information indicates that the master RLC entity of the first RB is located in the master network device, the secondary network device may deduce that the first RB is associated with p−M secondary RLC entities and one master RLC entity in the master network device.

When the third indication information indicates the foregoing item f, to be specific, when the third indication information indicates identifiers of p (where p=2 or 3) secondary RLC entities associated with the first RB in the master network device and the secondary network device, if the first indication information indicates that the master RLC entity of the first RB is located in the secondary network device, the secondary network device may deduce that the first RB is associated with p−M+1 secondary RLC entities and 0 master RLC entities in the master network device; or if the first indication information indicates that the master RLC entity of the first RB is located in the master network device, the secondary network device may deduce that the first RB is associated with p−M secondary RLC entities and one master RLC entity in the master network device.

When the third indication information indicates the foregoing item g, to be specific, when the third indication information indicates that the quantity of all RLC entities associated with the first RB in the master network device and the secondary network device is q (where q=3 or 4), if the first indication information indicates that the master RLC entity of the first RB is located in the secondary network device, the secondary network device may deduce that the first RB is associated with q-M secondary RLC entities and 0 master RLC entities in the master network device; or if the first indication information indicates that the master RLC entity of the first RB is located in the master network device, the secondary network device may deduce that the first RB is associated with q−M−1 secondary RLC entities and one master RLC entity in the master network device.

When the third indication information indicates the foregoing item h, to be specific, when the third indication information indicates identifiers of q (where q=3 or 4) RLC entities associated with the first RB in the master network device and the secondary network device, if the first indication information indicates that the master RLC entity of the first RB is located in the secondary network device, the secondary network device may deduce that the first RB is associated with q−M secondary RLC entities and 0 master RLC entities in the master network device; or if the first indication information indicates that the master RLC entity of the first RB is located in the master network device, the secondary network device may deduce that the first RB is associated with q−M−1 secondary RLC entities and one master RLC entity in the master network device.

The first indication information may further indicate the master RLC entity of the first RB in any one of the following five manners in addition to the foregoing Manner 1 to Manner 4.

Manner 5: The first indication information indicates a quantity and/or identifiers of all RLC entities associated with the first RB in the master network device, and a quantity and/or identifiers of all secondary RLC entities associated with the first RB in the master network device.

For example, the first indication information indicates that the quantity of all RLC entities associated with the first RB in the master network device is w (where w=1, 2, or 3), and the first indication information further indicates that the quantity of all secondary RLC entities associated with the first RB in the master network device is v (where v=0, 1, or 2). When w>v, it indicates that the master RLC entity associated with the first RB is located in the master network device, to be specific, the first RB is associated with v secondary RLC entities and one master RLC entity in the master network device. When w=v, it indicates that the master RLC entity associated with the first RB is located in the secondary network device, to be specific, the first RB is associated with w secondary RLC entities and 0 master RLC entities in the master network device.

Manner 6: The first indication information indicates a quantity and/or identifiers of all RLC entities associated with the first RB in the master network device, and a quantity and/or identifiers of master RLC entities associated with the first RB in the master network device.

For example, the first indication information indicates that the quantity of all RLC entities associated with the first RB in the master network device is w (where w=1, 2, or 3), and the first indication information further indicates that the quantity of master RLC entities associated with the first RB in the master network device is v' (where v'=0 or 1). When v'=1, it indicates that the master RLC entity associated with the first RB is located in the master network device, to be specific, the first RB is associated with w−1 secondary RLC entities and one master RLC entity in the master network device. When v'=0, it indicates that the master RLC entity associated with the first RB is located in the secondary network device, to be specific, the first RB is associated with w secondary RLC entities and 0 master RLC entities in the master network device.

Manner 7: The first indication information indicates an initial status of each secondary RLC entity associated with the first RB in the master network device, and a quantity and/or identifiers of all RLC entities associated with the first RB in the master network device.

Specifically, the first indication information indicates initial statuses of r (where r=0, 1, 2, or 3) RLC entities, and the first indication information further indicates that the quantity of all RLC entities associated with the first RB in the master network device is s (where s=1, 2, or 3). When r<s, it indicates that the master RLC entity associated with the first RB is located in the master network device, to be specific, the first RB is associated with r secondary RLC entities and one master RLC entity in the master network device. When r=s, it indicates that the master RLC entity associated with the first RB is located in the secondary network device, to be specific, the first RB is associated with r secondary RLC entities and 0 master RLC entities in the master network device.

Manner 8: The first indication information indicates an initial status of each secondary RLC entity associated with the first RB in the secondary network device, and a quantity and/or identifiers of all RLC entities associated with the first RB in the master network device.

Specifically, the first indication information indicates initial statuses of r' (where r'=0, 1, 2, or 3) RLC entities, and the first indication information further indicates that the quantity of all RLC entities associated with the first RB in the master network device is s (where s=1, 2, or 3). When r'=M, it indicates that the master RLC entity associated with the first RB is located in the master network device, to be specific, the first RB is associated with s−1 secondary RLC entities and one master RLC entity in the master network device. When r'<M, it indicates that the master RLC entity associated with the first RB is located in the secondary network device, to be specific, the first RB is associated with s secondary RLC entities and 0 master RLC entities in the master network device.

Manner 9: The first indication information indicates whether each RLC entity associated with the first RB in the master network device is the master RLC entity of the first RB.

Specifically, the first indication information includes h bits, where h is a positive integer. Different RLC entities associated with the first RB in the master network device correspond to different bits in the h bits, and the foregoing correspondence may be preset. Each of the h bits is for indicating whether an RLC entity corresponding to the bit is the master RLC entity. For example, when a value of any bit is "0", it indicates that an RLC entity corresponding to the bit is the master RLC entity; or when a value of any bit is "1", it indicates that an RLC entity corresponding to the bit is not the master RLC entity. Alternatively, when a value of any bit is "1", it indicates that an RLC entity corresponding to the bit is the master RLC entity; or when a value of any bit is "0", it indicates that an RLC entity corresponding to the bit is not the master RLC entity.

Optionally, after receiving the first indication information, the secondary network device sends fourth indication information to the master network device. Accordingly, the master network device receives the fourth indication information from the secondary network device. Optionally, the fourth indication information may be carried in an s-node addition request acknowledge message or an s-node modification request acknowledge message.

When the master RLC entity associated with the first RB is located in the secondary network device, the fourth indication information indicates that one of the RLC entities associated with the first RB in the secondary network device is the master RLC entity associated with the first RB. For example, the fourth indication information indicates an index of the master RLC entity associated with the first RB, or the fourth indication information indicates an identifier of a logical channel (which is also referred to as a master logical channel of the first RB) associated with the master RLC entity associated with the first RB. The master RLC entity associated with the first RB is determined by the secondary network device.

When the master RLC entity associated with the first RB is located in the master network device, the fourth indication information indicates a split secondary RLC entity associated with the first RB in the secondary network device. For example, the fourth indication information indicates an index of the split secondary RLC entity associated with the first RB, or an identifier of a logical channel associated with the split secondary RLC entity associated with the first RB. The logical channel associated with the split secondary RLC entity associated with the first RB is referred to as a split secondary logical channel (which is also referred to as a split secondary path). When a PDCP duplication function of the first RB is deactivated, the terminal device may perform data transmission with the master network device through the master logical channel located in the master network device, or the terminal device may perform data transmission with the secondary network device through the split secondary logical channel located in the secondary network device.

Optionally, step S501 may be replaced with step S501a.

S501a: The master network device sends first indication information to the secondary network device. Accordingly, the secondary network device receives the first indication information from the master network device. The first indication information is for requesting the secondary network device to set up a master RLC entity of a first RB. Alternatively, the first indication information is for requesting the secondary network device to set up a split secondary RLC entity of a first RB. Optionally, the first indication information may be carried in an s-node addition request message or an s-node modification request message.

The secondary network device determines an RLC entity associated with the first RB in the secondary network device. Specifically, the secondary network device receives configuration information from the master network device, where the configuration information indicates M RLC entities associated with the first RB in the secondary network device, and M is 1, 2, or 3. Optionally, the configuration information is carried in the s-node addition request message or the s-node modification request message.

After determining the RLC entity associated with the first RB in the secondary network device, the secondary network device determines the master RLC entity associated with the first RB. Specifically, when the first indication information is for requesting to set up the master RLC entity of the first RB, it indicates that the master RLC entity of the first RB is located in the secondary network device; or when the first indication information is for requesting to set up the split secondary RLC entity of the first RB, it indicates that the master RLC entity of the first RB is located in the master network device. In an optional manner, the first indication information includes 1 bit. When a value of the bit is "0", it indicates that the first indication information is for requesting to set up the master RLC entity of the first RB; or when a value of the bit is "1", it indicates that the first indication information is for requesting to set up the split secondary RLC entity of the first RB. Alternatively, when a value of the bit is "1", it indicates that the first indication information is for requesting to set up the master RLC entity of the first RB; or when a value of the bit is "0", it indicates that the first indication information is for requesting to set up the split secondary RLC entity of the first RB.

Optionally, the master network device further sends third indication information to the secondary network device. Accordingly, the secondary network device receives the third indication information from the master network device. For descriptions of the third indication information, refer to step S501. Details are not described herein again.

After receiving the first indication information, the secondary network device sends fourth indication information to the master network device. Accordingly, the master network device receives the fourth indication information from the secondary network device. For descriptions of the fourth indication information, refer to step S501. Details are not described herein again.

S502: The master network device sends fifth indication information to the terminal device. Accordingly, the terminal device receives the fifth indication information from the master network device. The fifth indication information may be carried in an RRC reconfiguration message, and the fifth indication information indicates the master RLC entity associated with the first RB. For example, the fifth indication information indicates the index of the master RLC entity associated with the first RB. Alternatively, the fifth indication information indicates the identifier of the logical channel associated with the master RLC entity associated with the first RB. The terminal device determines, based on the fifth indication information, the master RLC entity associated with the first RB.

Optionally, the fifth indication information further indicates the initial statuses of all secondary RLC entities associated with the first RB. Optionally, the fifth indication information further indicates an identifier of the split secondary RLC entity associated with the first RB or the identifier of the logical channel associated with the split secondary RLC entity associated with the first RB.

Optionally, step S502 may alternatively be replaced with S502a.

S502a: The secondary network device sends fifth indication information to the terminal device. Accordingly, the terminal device receives the fifth indication information from the secondary network device. The fifth indication information may be carried in an RRC reconfiguration message. The fifth indication information indicates any one or more of the index of the master RLC entity associated with the first RB/the identifier of the logical channel associated with the master RLC entity associated with the first RB, the index of the split secondary RLC entity associated with the first RB/the identifier of the logical channel associated with the split secondary RLC entity associated with the first RB, or the initial statuses of all secondary RLC entities associated with the first RB.

S503: The secondary network device sends second indication information with a length of 3 bits to the terminal device. Accordingly, the terminal device receives the second indication information with the length of 3 bits from the secondary network device. The second indication information indicates a status of each secondary RLC entity of all secondary RLC entities associated with the first RB, and different RLC entities associated with the first RB correspond to different bits in the 3 bits. Optionally, the second indication information is carried in a MAC CE.

The following describes a correspondence between each of the foregoing 3 bits and each secondary RLC entity of all secondary RLC entities associated with the first RB. Specifically, the correspondence may be preset in a protocol. For example, the foregoing correspondence meets the following two principles.

Principle 1: In the foregoing 3 bits, a use status of a secondary RLC entity of the first RB in the master network device and a use status of a secondary RLC entity of the first RB in the secondary network device are sequentially arranged in a least significant bit to a most significant bit. In other words, in the foregoing 3 bits, the least significant bit is for indicating the use status of the secondary RLC entity of the first RB in the master network device, and the most significant bit is for indicating the use status of the secondary RLC entity of the first RB in the secondary network device.

Principle 2: For secondary RLC entities of a same network device, in the foregoing 3 bits, an RLC entity corresponding to a logical channel with a smallest logical channel identifier and an RLC entity corresponding to a logical channel with a largest logical channel identifier are sequentially arranged in a least significant bit to a most significant bit. In other words, in the foregoing 3 bits, the least significant bit is for indicating a use status of the RLC entity corresponding to the logical channel that is associated with the first RB and that has the smallest logical channel identifier, and the most significant bit is for indicating a use status of the RLC entity corresponding to the logical channel that is associated with the first RB and that has the largest logical channel identifier.

Figure 4C:
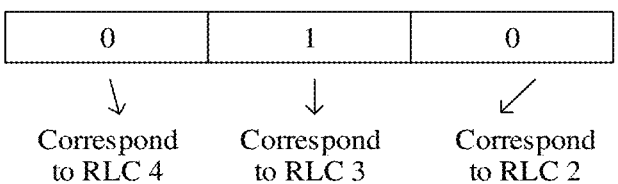
FIG. 4C and FIG. 4D are example diagrams of second indication information.

For example, when the first RB is associated with three secondary RLC entities and one master RLC entity in total, as shown in FIG. 4A, it is assumed that an identifier of LCH 1<an identifier of LCH 2<an identifier of LCH 3<an identifier of LCH 4. As shown in FIG. 4C, when RLC 1 is the master RLC entity, the third bit of the foregoing 3 bits indicates a status of RLC 2, the second bit indicates a status of RLC 3, and the first bit indicates a status of RLC 4. When RLC 2 is the master RLC entity, the third bit of the foregoing 3 bits indicates a status of RLC 1, the second bit indicates a status of RLC 3, and the first bit indicates a status of RLC 4. When RLC 3 is the master RLC entity, the third bit of the foregoing 3 bits indicates a status of RLC 1, the second bit indicates a status of RLC 2, and the first bit indicates a status of RLC 4. When RLC 4 is the master RLC entity, the third bit of the foregoing 3 bits indicates a status of RLC 1, the second bit indicates a status of RLC 2, and the first bit indicates a status of RLC 3.

Figure 4D:
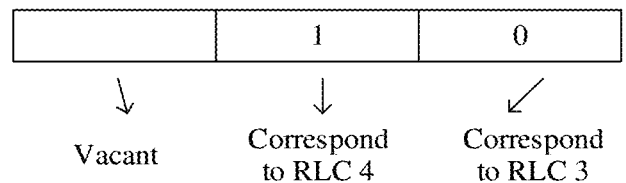

For example, when the first RB is associated with two secondary RLC entities and one master RLC entity in total, as shown in FIG. 4B, it is assumed that an identifier of LCH 1<an identifier of LCH 3<an identifier of LCH 4. As shown in FIG. 4D, when RLC 1 is the master RLC entity, the third bit of the foregoing 3 bits indicates a status of RLC 3, the second bit indicates a status of RLC 4, and the first bit is left vacant. When RLC 3 is the master RLC entity, the third bit of the foregoing 3 bits indicates a status of RLC 1, the second bit indicates a status of RLC 4, and the first bit is left vacant. When RLC 4 is the master RLC entity, the third bit of the foregoing 3 bits indicates a status of RLC 1, the second bit indicates a status of RLC 3, and the first bit is left vacant.

The terminal device determines, based on a value of each of the foregoing 3 bits, a status of a secondary RLC entity corresponding to the bit.

In an optional manner, when a value of any one of the foregoing 3 bits is "0", it indicates that a status of a secondary RLC entity corresponding to the bit is an inactive state. Alternatively, this may be understood as: It indicates that a status of a logical channel associated with a secondary RLC entity corresponding to the bit is an inactive state. When a value of any one of the foregoing 3 bits is "1", it indicates that a status of a secondary RLC entity corresponding to the bit is an active state. Alternatively, this may be understood as: It indicates that a status of a logical channel associated with a secondary RLC entity corresponding to the bit is an active state.

In another optional manner, when a value of any one of the foregoing 3 bits is "1", it indicates that a status of a secondary RLC entity corresponding to the bit is an inactive state. Alternatively, this may be understood as: It indicates that a status of a logical channel associated with a secondary RLC entity corresponding to the bit is an inactive state. When a value of any one of the foregoing 3 bits is "0", it indicates that a status of a secondary RLC entity corresponding to the bit is an active state. Alternatively, this may be understood as: It indicates that a status of a logical channel associated with a secondary RLC entity corresponding to the bit is an active state.

When a status of any secondary RLC entity associated with the first RB is the active state, the secondary RLC entity is allowed to be used for PDCP duplication. In other words, the terminal device can perform PDCP layer duplication transmission with the network device through a logical channel associated with the secondary RLC entity. When a status of any secondary RLC entity associated with the first RB is the inactive state, the secondary RLC entity is not allowed to be used for PDCP duplication. In other words, the terminal device cannot perform PDCP layer duplication transmission with the network device through a logical channel associated with the secondary RLC entity.

When statuses of all secondary RLC entities associated with the first RB are the inactive state, the terminal device stops the PDCP duplication function of the first RB, and performs split transmission. Specifically, the terminal device determines, based on a threshold for the split transmission, whether to separately transmit, through a master logical channel of the first RB and a split secondary logical channel of the first RB, different data packets to a network device on which the master logical channel is located and a network device on which the split secondary logical channel is located. Specifically, when an amount of to-be-sent data is less than the threshold for the split transmission, the terminal device performs, through the master logical channel of the first RB, transmission with the network device on which the master logical channel is located. When an amount of to-be-sent data is greater than or equal to the threshold for the split transmission, the terminal device separately sends, through the master logical channel of the first RB and the split secondary logical channel of the first RB, different data packets to the network device on which the master logical channel is located and the network device on which the split secondary logical channel is located.

After determining, based on the second indication information, the statuses of all the secondary RLC entities associated with the first RB, the terminal device activates or deactivates a corresponding secondary RLC entity and a logical channel corresponding to the secondary RLC entity, to perform data transmission with the master network device and the secondary network device.

The foregoing embodiment provides a data transmission method. When more than two RLC entities (or logical channels) are configured for a radio bearer, the secondary network device receives indication information from the master network device. The secondary network device may determine, based on the indication information, a master RLC entity associated with the radio bearer, to accurately indicate, to the terminal device, RLC entities that need to be activated and deactivated, thereby improving data transmission reliability.

Figure 4E:
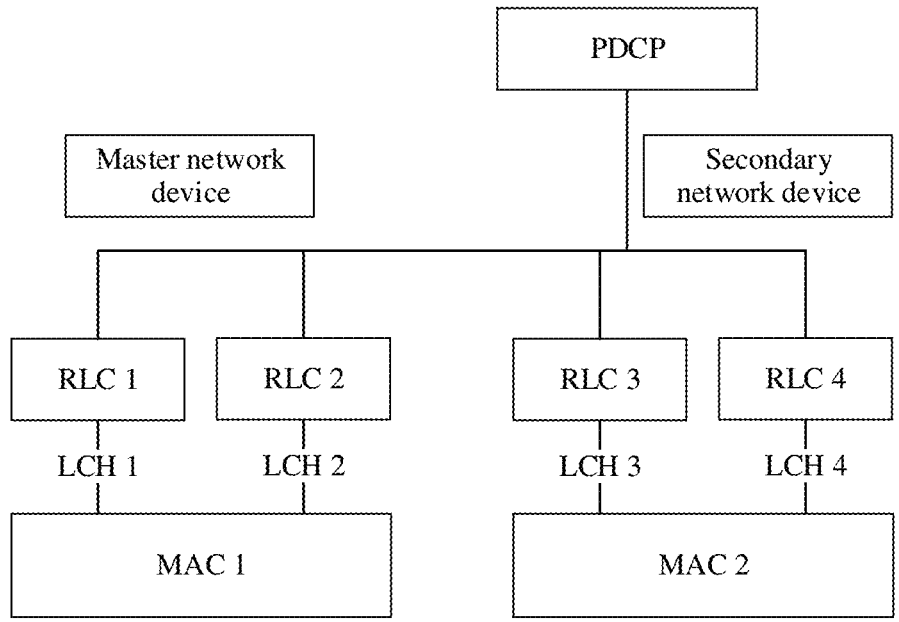
FIG. 4E and FIG. 4F each show a network architecture related to implementation of PDCP duplication in a DC+CA scenario.
Figure 4F:
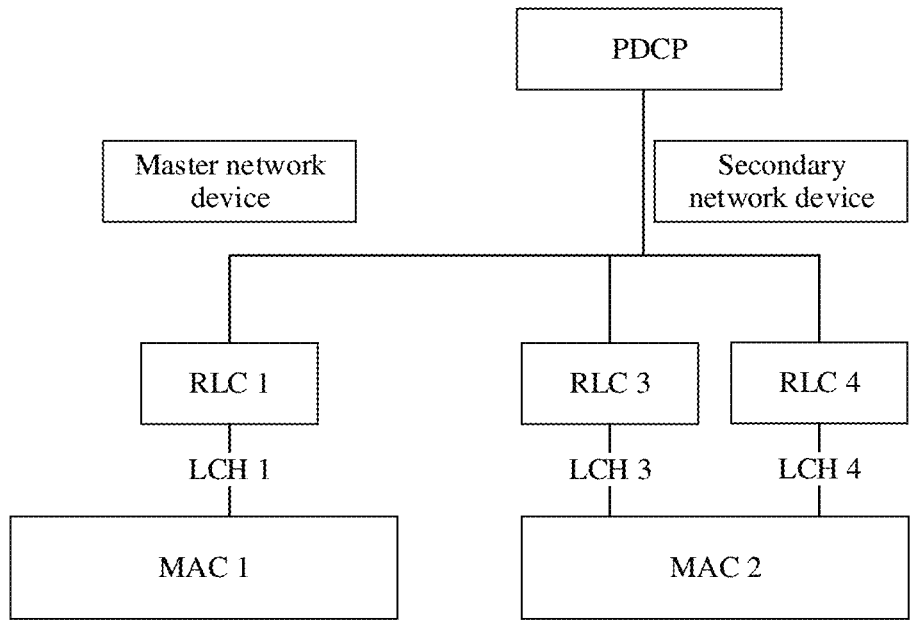
Figure 6:
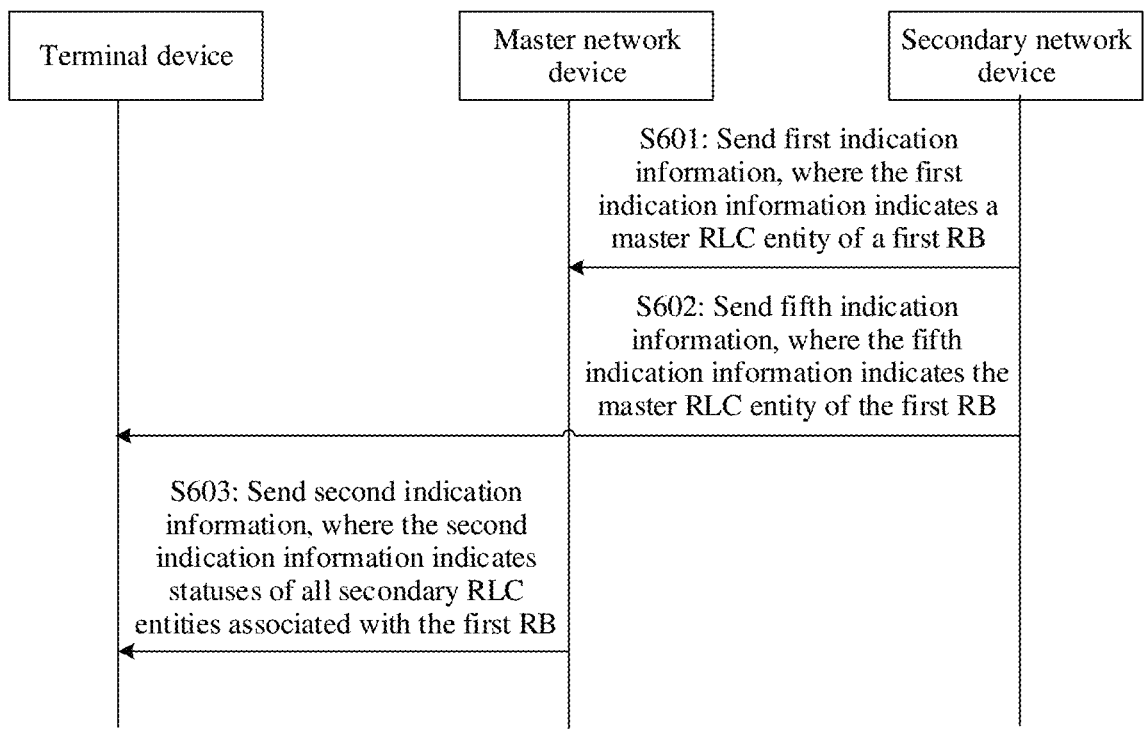

FIG. 6 is a schematic flowchart of a data transmission method according to an embodiment of this application. This embodiment relates to a specific process of data transmission between a secondary network device, a master network device, and a terminal device. This embodiment relates to a scenario in which a PDCP entity associated with a radio bearer is located in the secondary network device. FIG. 4E and FIG. 4F are two examples of the scenario. As shown in FIG. 6, the method may include S601, S602, and S603. A sequence of performing S601, S602, and S603 is not limited in this embodiment of this application.

S601: The secondary network device sends first indication information to the master network device. Accordingly, the master network device receives the first indication information from the secondary network device. The first indication information indicates a master RLC entity of a first RB, and the first RB is associated with one master RLC entity and a maximum of three secondary RLC entities. Optionally, the first indication information is carried in an s-node addition request acknowledge message, an s-node modification request acknowledge message, or an s-node modification required message.

The master network device determines an RLC entity associated with the first RB in the master network device. The master network device receives configuration information from the secondary network device, where the configuration information indicates K RLC entities associated with the first RB in the master network device, and K is 1, 2, or 3. Optionally, the configuration information is carried in the s-node addition request acknowledge message, the s-node modification request acknowledge message, or the s-node modification required message.

After determining the RLC entity associated with the first RB in the master network device, the master network device determines the master RLC entity associated with the first RB. A manner in which the first indication information indicates the master RLC entity of the first RB includes any one of the following four manners.

Manner 1: The first indication information indicates whether there is the master RLC entity of the first RB in the K RLC entities.

Specifically, the first indication information includes 1 bit. When a value of the bit is "0", it indicates that there is the master RLC entity of the first RB in the K RLC entities (in other words, the master RLC entity of the first RB is located in the master network device); or when a value of the bit is "1", it indicates that there is not the master RLC entity of the first RB in the K RLC entities (in other words, the master RLC entity of the first RB is located in the secondary network device). Alternatively, when a value of the bit is "1", it indicates that there is the master RLC entity of the first RB in the K RLC entities (in other words, the master RLC entity of the first RB is located in the master network device); or when a value of the bit is "0", it indicates that there is not the master RLC entity of the first RB in the K RLC entities (in other words, the master RLC entity of the first RB is located in the secondary network device).

Manner 2: The first indication information indicates a quantity of secondary RLC entities of the first RB in the K RLC entities.

Specifically, the first indication information includes 2 bits. When a value of the bits is "00", it indicates that the quantity of secondary RLC entities of the first RB in the K RLC entities is 0. When the value of the bits is "01", it indicates that the quantity of secondary RLC entities of the first RB in the K RLC entities is 1. When the value of the bits is "10", it indicates that the quantity of secondary RLC entities of the first RB in the K RLC entities is 2. When the value of the bits is "11", it indicates that the quantity of secondary RLC entities of the first RB in the K RLC entities is 3.

In Manner 2, if the quantity, indicated by the first indication information, of secondary RLC entities of the first RB is less than K, it indicates that the master RLC entity of the first RB is located in the master network device; or if the quantity, indicated by the first indication information, of secondary RLC entities of the first RB is equal to K, it indicates that the master RLC entity of the first RB is located in the secondary network device.

For example, when the master network device determines, based on the first indication information, that the quantity of secondary RLC entities of the first RB in the K RLC entities is 1, and if a value of K is 1, it indicates that the master RLC entity of the first RB is located in the secondary network device; or if a value of K is 2, it indicates that two RLC entities associated with the first RB in the master network device are one secondary RLC entity and one master RLC entity, in other words, the master RLC entity of the first RB is located in the master network device.

Manner 3: The first indication information indicates whether there is the master RLC entity of the first RB in an RLC entity associated with the first RB in the secondary network device.

In an optional manner, the first indication information includes 1 bit. When a value of the bit is "0", it indicates that there is the master RLC entity of the first RB in the RLC entity associated with the first RB in the secondary network device (in other words, the master RLC entity of the first RB is located in the secondary network device); or when a value of the bit is "1", it indicates that there is not the master RLC entity of the first RB in the RLC entity associated with the first RB in the secondary network device (in other words, the master RLC entity of the first RB is located in the master network device). Alternatively, when a value of the bit is "1", it indicates that there is the master RLC entity of the first RB in the RLC entity associated with the first RB in the secondary network device (in other words, the master RLC entity of the first RB is located in the secondary network device); or when a value of the bit is "0", it indicates that there is not the master RLC entity of the first RB in the RLC entity associated with the first RB in the secondary network device (in other words, the master RLC entity of the first RB is located in the master network device).

In another optional manner, when the master RLC entity of the first RB is located in the secondary network device, the first indication information indicates an index of the master RLC entity of the first RB or an identifier of a logical channel associated with the master RLC entity of the first RB.

Optionally, in Manner 1 to Manner 3, the first indication information further indicates an initial status of each secondary RLC entity associated with the first RB. For specific descriptions, refer to step S501. Details are not described herein again.

Manner 4: The first indication information indicates initial statuses of Y RLC entities in the K RLC entities, where Y is 0, 1, 2, or 3.

Specifically, because an initial status of the master RLC entity of the first RB does not need to be indicated, when the first indication information indicates initial statuses of two RLC entities, it indicates that the master RLC entity of the first RB is located in the secondary network device.

For example, when the first indication information indicates an initial status of one RLC entity, and if a value of K is 1, it indicates that the master RLC entity of the first RB is located in the secondary network device; or if a value of K is 2, it indicates that the first indication information indicates only an initial status of one of two RLC entities, in other words, the other RLC entity whose initial status is not indicated is the master RLC entity, that is, the master RLC entity of the first RB is located in the master network device.

For example, when the first indication information indicates an initial status of 0 RLC entities, a value of K can only be 1, which indicates that the only one RLC entity associated with the first RB in the master network device is the master RLC entity. In other words, the master RLC entity of the first RB is located in the master network device.

When the first indication information indicates the master RLC entity of the first RB in any one of the foregoing four manners, the master network device may determine, based on the first indication information and the value of K, the quantity of secondary RLC entities associated with the first RB in the master network device and a quantity of master RLC entities associated with the first RB in the master network device.

Optionally, in the foregoing Manner 1 to Manner 4, the master network device further sends third indication information to the secondary network device. Accordingly, the secondary network device receives the third indication information from the master network device. Optionally, the third indication information is carried in an s-node addition request acknowledge message, an s-node modification request acknowledge message, or an s-node modification required message. The third indication information and the first indication information may be carried in a same message or different messages.

The third indication information may further indicate any one or more of the following items:
  (a) a quantity of RLC entities associated with the first RB in the secondary network device;
  (b) identifiers of all RLC entities associated with the first RB in the secondary network device;
  (c) a quantity of secondary RLC entities associated with the first RB in the secondary network device;
  (d) identifiers of all secondary RLC entities associated with the first RB in the secondary network device;
  (e) a quantity of secondary RLC entities associated with the first RB;
  (f) identifiers of all secondary RLC entities associated with the first RB;
  (g) a quantity of RLC entities associated with the first RB; or
  (h) identifiers of all RLC entities associated with the first RB.

The first indication information may further indicate the master RLC entity of the first RB in any one of the following five manners in addition to the foregoing Manner 1 to Manner 4.

Manner 5: The first indication information indicates a quantity and/or identifiers of all RLC entities associated with the first RB in the secondary network device, and a quantity and/or identifiers of all secondary RLC entities associated with the first RB in the secondary network device.

Manner 6: The first indication information indicates a quantity and/or identifiers of all RLC entities associated with the first RB in the secondary network device, and a quantity and/or identifiers of all master RLC entities associated with the first RB in the secondary network device.

Manner 7: The first indication information indicates an initial status of each secondary RLC entity associated with the first RB in the secondary network device, and a quantity and/or identifiers of all RLC entities associated with the first RB in the secondary network device.

Manner 8: The first indication information indicates an initial status of each secondary RLC entity associated with the first RB in the master network device, and a quantity and/or identifiers of all RLC entities associated with the first RB in the secondary network device.

Manner 9: The first indication information indicates whether each RLC entity associated with the first RB in the secondary network device is the master RLC entity of the first RB.

Specific indication manners of Manner 5 to Manner 9 are similar to Manner 5 to Manner 9 in S501, and only the "master network device" and the "secondary network device" need to be exchanged. Details are not described herein again.

Optionally, after receiving the first indication information, the master network device sends fourth indication information to the secondary network device. Accordingly, the secondary network device receives the fourth indication information from the master network device. Optionally, the fourth indication information may be carried in an s-node addition request acknowledge message or an s-node modification request acknowledge message.

When the master RLC entity associated with the first RB is located in the master network device, the fourth indication information indicates that one of the RLC entities associated with the first RB in the master network device is the master RLC entity associated with the first RB. For example, the fourth indication information indicates an index of the master RLC entity associated with the first RB, or the fourth indication information indicates an identifier of a logical channel (which is also referred to as a master logical channel of the first RB) associated with the master RLC entity associated with the first RB. The master RLC entity associated with the first RB is determined by the master network device.

When the master RLC entity associated with the first RB is located in the secondary network device, the fourth indication information indicates a split secondary RLC entity associated with the first RB in the master network device. For example, the fourth indication information indicates an index of the split secondary RLC entity associated with the first RB, or an identifier of a logical channel associated with the split secondary RLC entity associated with the first RB. The logical channel associated with the split secondary RLC entity associated with the first RB is referred to as a split secondary logical channel (which is also referred to as a split secondary path). When a PDCP duplication function of the first RB is deactivated, the terminal device may perform data transmission with the secondary network device through the master logical channel located in the secondary network device, or the terminal device may perform data transmission with the master network device through the split secondary logical channel located in the master network device.

Optionally, step S601 may be replaced with step S601a.

S601a: The secondary network device sends first indication information to the master network device. Accordingly, the master network device receives the first indication information from the secondary network device. The first indication information is for requesting the master network device to set up a master RLC entity of a first RB. Alternatively, the first indication information is for requesting the master network device to set up a split secondary RLC entity of a first RB. Optionally, the first indication information is carried in an s-node addition request acknowledge message or an s-node modification request acknowledge message.

The master network device determines an RLC entity associated with the first RB in the master network device. The master network device receives configuration information from the secondary network device, where the configuration information indicates K RLC entities associated with the first RB in the master network device, and K is 1, 2, or 3. Optionally, the configuration information is carried in the s-node addition request acknowledge message or the s-node modification request acknowledge message.

After determining the RLC entity associated with the first RB in the master network device, the master network device determines the master RLC entity associated with the first RB. Specifically, when the first indication information is for requesting to set up the master RLC entity of the first RB, it indicates that the master RLC entity of the first RB is located in the master network device; or when the first indication information is for requesting to set up the split secondary RLC entity of the first RB, it indicates that the master RLC entity of the first RB is located in the secondary network device. In an optional manner, the first indication information includes 1 bit. When a value of the bit is "0", it indicates that the first indication information is for requesting to set up the master RLC entity of the first RB; or when a value of the bit is "1", it indicates that the first indication information is for requesting to set up the split secondary RLC entity of the first RB. Alternatively, when a value of the bit is "1", it indicates that the first indication information is for requesting to set up the master RLC entity of the first RB; or when a value of the bit is "0", it indicates that the first indication information is for requesting to set up the split secondary RLC entity of the first RB.

Optionally, the secondary network device further sends third indication information to the master network device. Accordingly, the master network device receives the third indication information from the secondary network device. For descriptions of the third indication information, refer to step S601. Details are not described herein again.

After receiving the first indication information, the master network device sends fourth indication information to the secondary network device. Accordingly, the secondary network device receives the fourth indication information from the master network device. For descriptions of the fourth indication information, refer to step S601. Details are not described herein again.

S602: The secondary network device sends fifth indication information to the terminal device. Accordingly, the terminal device receives the fifth indication information from the secondary network device. The fifth indication information may be an RRC reconfiguration message, and the fifth indication information indicates the master RLC entity associated with the first RB. For example, the fifth indication information indicates the identifier of the master RLC entity associated with the first RB. Alternatively, the fifth indication information indicates the identifier of the logical channel associated with the master RLC entity associated with the first RB. The terminal device determines, based on the fifth indication information, the master RLC entity associated with the first RB.

Optionally, the fifth indication information further indicates the initial statuses of all secondary RLC entities associated with the first RB. Optionally, the fifth indication information further indicates an identifier of the split secondary RLC entity associated with the first RB or the identifier of the logical channel associated with the split secondary RLC entity associated with the first RB.

Optionally, step S602 may alternatively be replaced with S602a.

S602a: The master network device sends fifth indication information to the terminal device. Accordingly, the terminal device receives the fifth indication information from the secondary network device. The fifth indication information may be carried in an RRC reconfiguration message. The fifth indication information indicates any one or more of the index of the master RLC entity associated with the first RB/the identifier of the logical channel associated with the master RLC entity associated with the first RB, the index of the split secondary RLC entity associated with the first RB/the identifier of the logical channel associated with the split secondary RLC entity associated with the first RB, or the initial statuses of all secondary RLC entities associated with the first RB.

S603: The master network device sends second indication information with a length of 3 bits to the terminal device. Accordingly, the terminal device receives the second indication information with the length of 3 bits from the master network device. The second indication information indicates a status of each secondary RLC entity of all secondary RLC entities associated with the first RB, and different RLC entities associated with the first RB correspond to different bits in the 3 bits. Optionally, the second indication information is carried in a MAC CE.

There is a correspondence between each of the foregoing 3 bits and each secondary RLC entity of all secondary RLC entities associated with the first RB. For a specific corresponding rule, refer to step S503. Details are not described herein again.

The terminal device determines, based on a value of each of the foregoing 3 bits, a status of a secondary RLC entity corresponding to the bit. For specific descriptions, refer to step S503. Details are not described herein again.

The foregoing embodiment provides a data transmission method. When more than two RLC entities (or logical channels) are configured for a radio bearer, the master network device receives indication information from the secondary network device. The master network device may determine, based on the indication information, a master RLC entity associated with the radio bearer, to accurately indicate, to the terminal device, RLC entities that need to be activated and deactivated, thereby improving data transmission reliability.

Figure 7:
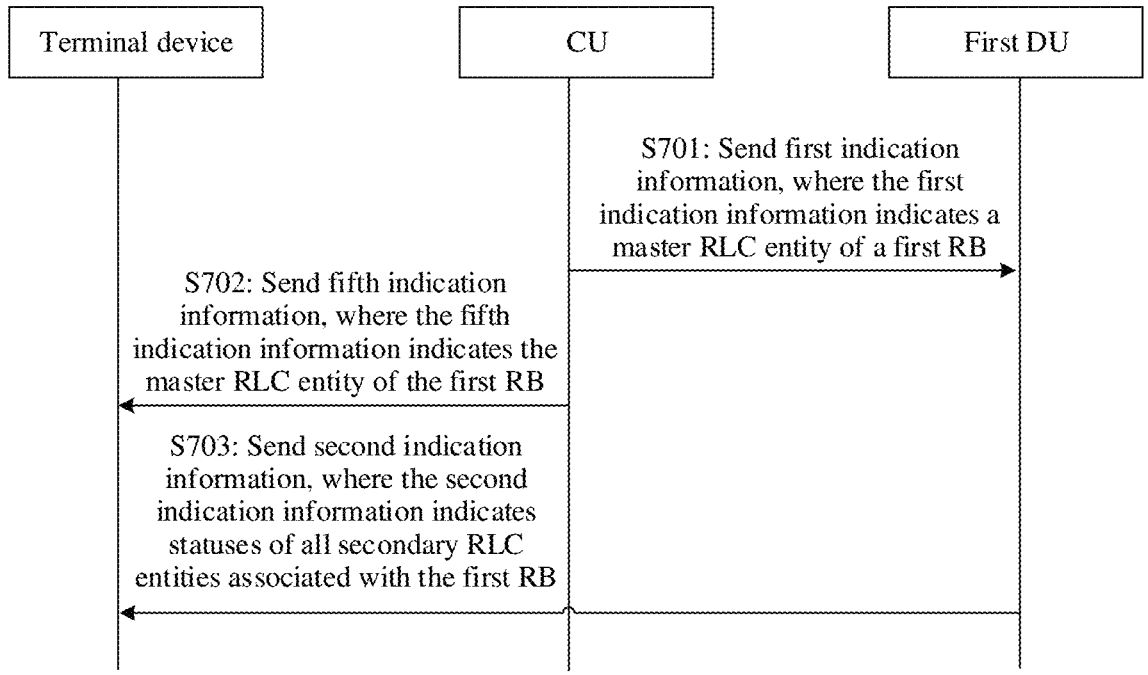

FIG. 7 is a schematic flowchart of a data transmission method according to an embodiment of this application. The embodiment shown in FIG. 7 is applicable to a network architecture for implementing a PDCP duplication function in a DC+CA scenario. A CU and a DU of a network device are split. This embodiment relates to a specific process of data transmission between a first DU, a CU, and a terminal device. A PDCP entity associated with a radio bearer is located in a second DU, to be specific, the second DU includes the PDCP entity, an RLC entity, and a MAC entity, and the first DU includes an RLC entity and a MAC entity. In the embodiment shown in FIG. 7, when the CU is split into a control plane CU entity (namely, a CU-CP entity) and a user plane CU entity (namely, a CU-UP entity), the CU-CP implements an operation of the CU in this embodiment.

As shown in FIG. 7, the method may include S701, S702, and S703. A sequence of performing S701, S702, and S703 is not limited in this embodiment of this application.

S701: The CU sends first indication information to the first DU. Accordingly, the first DU receives the first indication information from the CU. The first indication information indicates a master RLC entity of a first RB, and the first RB is associated with one master RLC entity and a maximum of three secondary RLC entities. Optionally, the first indication information is carried in a context setup request message or a context modification request message.

The first DU determines an RLC entity associated with the first RB in the first DU. Specifically, the first DU receives configuration information from the CU, where the configuration information indicates M RLC entities associated with the first RB in the first DU, and M is 1, 2, or 3. The configuration information may be carried in the context setup request message or the context modification request message.

After determining the RLC entity associated with the first RB in the first DU, the first DU determines the master RLC entity associated with the first RB. There is only one master RLC entity of the first RB. In other words, the master RLC entity of the first RB is located in the first DU or the second DU. For a manner in which the first indication information indicates the master RLC entity of the first RB, refer to the descriptions in step S501 in the embodiment shown in FIG. 5. Only the "secondary network device" in Manner 1 to Manner 4 in S501 needs to be replaced with the first DU, and only the "master network device" needs to be replaced with the second DU. Details are not described herein again.

Optionally, in the foregoing Manner 1 to Manner 4, the CU further sends third indication information to the first DU. Accordingly, the first DU receives the third indication information from the CU. The third indication information may be carried in a context setup request message or a context modification request message. Specifically, for descriptions of the third indication information, refer to S501. Only the "secondary network device" needs to be replaced with the first DU, and only the "master network device" needs to be replaced with the second DU. Details are not described herein again.

The first indication information may further indicate the master RLC entity of the first RB in any one of Manner 5 to Manner 9 in S501 in addition to the foregoing Manner 1 to Manner 4. Only the "secondary network device" in Manner 5 to Manner 9 needs to be replaced with the first DU, and only the "master network device" needs to be replaced with the second DU. Details are not described herein again.

Optionally, after receiving the first indication information, the first DU sends fourth indication information to the CU. Accordingly, the CU receives the fourth indication information from the first DU. Optionally, the fourth indication information may be carried in a context setup response message or a context modification response message.

When the master RLC entity associated with the first RB is located in the first DU, the fourth indication information indicates that one of the RLC entities associated with the first RB in the first DU is the master RLC entity associated with the first RB. For example, the fourth indication information indicates an identifier of the master RLC entity associated with the first RB, or the fourth indication information indicates an identifier of a logical channel (which is also referred to as a master logical channel of the first RB) associated with the master RLC entity associated with the first RB. The master RLC entity associated with the first RB is determined by the first DU.

When the master RLC entity associated with the first RB is located in the second DU, the fourth indication information indicates a split secondary RLC entity associated with the first RB in the first DU. For example, the fourth indication information indicates an index of the split secondary RLC entity associated with the first RB, or an identifier of a logical channel associated with the split secondary RLC entity associated with the first RB. The logical channel associated with the split secondary RLC entity associated with the first RB is referred to as a split secondary logical channel (which is also referred to as a split secondary path). When a PDCP duplication function of the first RB is deactivated, the terminal device may perform data transmission with the second DU through the master logical channel located in the second DU, or the terminal device may perform data transmission with the first DU through the split secondary logical channel located in the first DU.

Optionally, step S701 may be replaced with step S701a.

S701a: The CU sends first indication information to the first DU. Accordingly, the first DU receives the first indication information from the CU. The first indication information is for requesting the first DU to set up a master RLC entity of a first RB. Alternatively, the first indication information is for requesting the first DU to set up a split secondary RLC entity of a first RB. Optionally, the first indication information is carried in a context setup request message or a context modification request message.

The first DU determines an RLC entity associated with the first RB in the first DU. Specifically, the first DU receives configuration information from the CU, where the configuration information indicates M RLC entities associated with the first RB in the first DU, and M is 1, 2, or 3. The configuration information may be carried in the context setup request message or the context modification request message.

After determining the RLC entity associated with the first RB in the first DU, the first DU determines the master RLC entity associated with the first RB. Specifically, when the first indication information is for requesting to set up the master RLC entity of the first RB, it indicates that the master RLC entity of the first RB is located in the first DU; or when the first indication information is for requesting to set up the split secondary RLC entity of the first RB, it indicates that the master RLC entity of the first RB is located in the second DU. In an optional manner, the first indication information includes 1 bit. When a value of the bit is "0", it indicates that the first indication information is for requesting to set up the master RLC entity of the first RB; or when a value of the bit is "1", it indicates that the first indication information is for requesting to set up the split secondary RLC entity of the first RB. Alternatively, when a value of the bit is "1", it indicates that the first indication information is for requesting to set up the master RLC entity of the first RB; or when a value of the bit is "0", it indicates that the first indication information is for requesting to set up the split secondary RLC entity of the first RB.

Optionally, the CU further sends third indication information to the first DU. Accordingly, the first DU receives the third indication information from the CU. For descriptions of the third indication information, refer to step S701. Details are not described herein again.

After receiving the first indication information, the first DU sends fourth indication information to the CU. Accordingly, the CU receives the fourth indication information from the first DU. For descriptions of the fourth indication information, refer to step S701. Details are not described herein again.

S702: The CU sends fifth indication information to the terminal device. Accordingly, the terminal device receives the fifth indication information from the CU. For descriptions of the fifth indication information, refer to step S502 in the embodiment shown in FIG. 5.

The terminal device determines, based on the fifth indication information, the master RLC entity associated with the first RB, and further determines, based on second indication information, that statuses of all secondary RLC entities associated with the first RB are an active state or an inactive state. For specific descriptions, refer to step S502 in the embodiment shown in FIG. 5.

S703: The first DU sends the second indication information to the terminal device. Accordingly, the terminal device receives the second indication information from the first DU. The second indication information indicates a status of each secondary RLC entity of all secondary RLC entities associated with the first RB. For specific descriptions of the second indication information, refer to step S503 in the embodiment shown in FIG. 5. Only the "secondary network device" in step S503 needs to be replaced with the first DU, and only the "master network device" needs to be replaced with the second DU. Details are not described herein again.

The foregoing embodiment provides a data transmission method. When more than two RLC entities (or logical channels) are configured for a radio bearer, the first DU receives indication information from the CU. The first DU may determine, based on the indication information, a master RLC entity associated with the radio bearer, to accurately indicate, to the terminal device, RLC entities that need to be activated and deactivated, thereby improving data transmission reliability.

Figure 8:
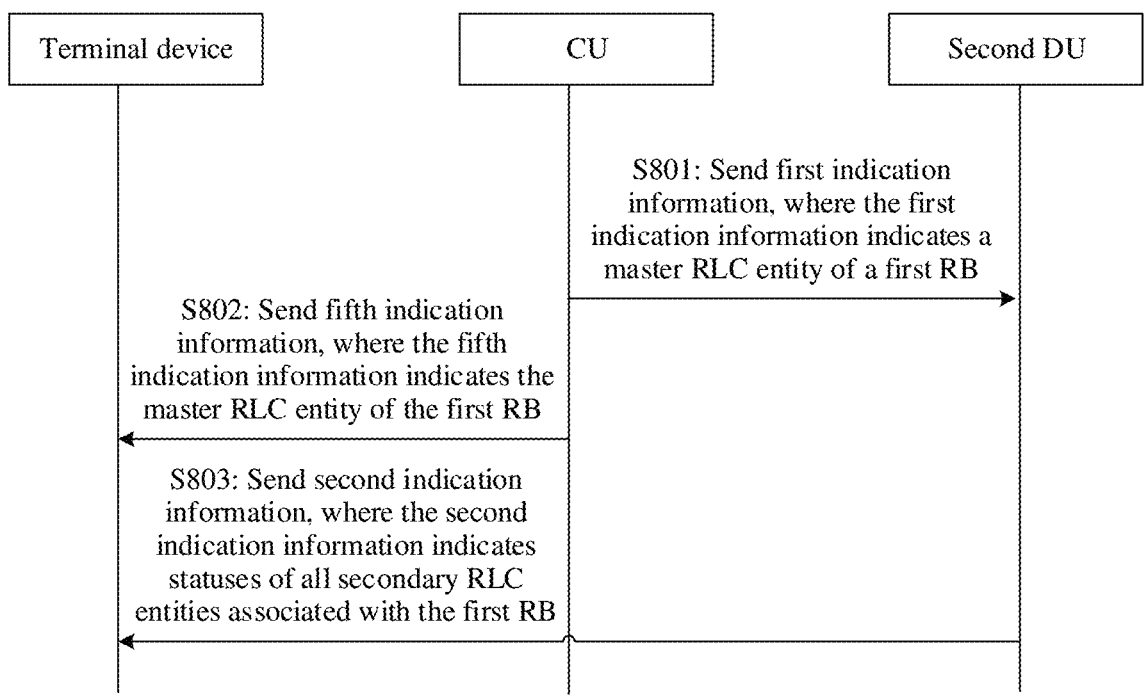

FIG. 8 is a schematic flowchart of a data transmission method according to an embodiment of this application. The embodiment shown in FIG. 8 is applicable to a network architecture for implementing a PDCP duplication function in a DC+CA scenario. A CU and a DU of a network device are split. This embodiment relates to a specific process of data transmission between a second DU, a CU, and a terminal device. A PDCP entity associated with a radio bearer is located in a first DU, to be specific, the first DU includes the PDCP entity, an RLC entity, and a MAC entity, and the second DU includes an RLC entity and a MAC entity. In the embodiment shown in FIG. 8, when the CU is split into a control plane CU entity (namely, a CU-CP entity) and a user plane CU entity (namely, a CU-UP entity), the CU-CP implements an operation of the CU in this embodiment.

As shown in FIG. 8, the method may include S801, S802, and S803. A sequence of performing S801, S802, and S803 is not limited in this embodiment of this application.

S801: The CU sends first indication information to the second DU. Accordingly, the second DU receives the first indication information from the CU. The first indication information indicates a master RLC entity of a first RB, and the first RB is associated with one master RLC entity and a maximum of three secondary RLC entities. Optionally, the first indication information may be carried in a context setup request message or a context modification request message.

The second DU determines an RLC entity associated with the first RB in the second DU. Specifically, the second DU receives configuration information from the CU, where the configuration information indicates K RLC entities associated with the first RB in the second DU, and K is 1, 2, or 3. The configuration information may be carried in the context setup request message or the context modification request message.

After determining the RLC entity associated with the first RB in the second DU, the second DU determines the master RLC entity associated with the first RB. For a manner in which the first indication information indicates the master RLC entity of the first RB, refer to the descriptions in step S601 in the embodiment shown in FIG. 6. Only the "master network device" in step S601 needs to be replaced with the second DU, and only the "secondary network device" needs to be replaced with the first DU. Details are not described herein again.

Optionally, after receiving the first indication information, the second DU sends fourth indication information to the CU. Accordingly, the CU receives the fourth indication information from the second DU. Optionally, the fourth indication information may be a context setup response message or a context modification response message.

When the master RLC entity associated with the first RB is located in the second DU, the fourth indication information indicates that one of the RLC entities associated with the first RB in the second DU is the master RLC entity associated with the first RB. For example, the fourth indication information indicates an index of the master RLC entity associated with the first RB, or the fourth indication information indicates an identifier of a logical channel associated with the master RLC entity associated with the first RB. The master RLC entity associated with the first RB is determined by the second DU.

When the master RLC entity associated with the first RB is located in the first DU, the fourth indication information indicates that a logical channel corresponding to one of the RLC entities associated with the first RB in the second DU is a split secondary logical channel (which is also referred to as a split secondary path). Specifically, the fourth indication information may indicate an identifier of the split secondary logical channel. When a PDCP duplication function of the first RB is deactivated, the terminal device may perform data transmission with the first DU through the master RLC entity located in the first DU, or the terminal device may perform data transmission with the second DU through the split secondary logical channel located in the second DU.

Optionally, step S801 may be replaced with step S801a.

S801a: The CU sends first indication information to the second DU. Accordingly, the second DU receives the first indication information from the CU. The first indication information is for requesting the second DU to set up a master RLC entity of a first RB. Alternatively, the first indication information is for requesting the second DU to set up a split secondary RLC entity of a first RB. Optionally, the first indication information is carried in a context setup request message or a context modification request message.

The second DU determines an RLC entity associated with the first RB in the second DU. Specifically, the second DU receives configuration information from the CU, where the configuration information indicates K RLC entities associated with the first RB in the second DU, and K is 1, 2, or 3. The configuration information may be carried in the context setup request message or the context modification request message.

After determining the RLC entity associated with the first RB in the second DU, the second DU determines the master RLC entity associated with the first RB. Specifically, when the first indication information is for requesting to set up the master RLC entity of the first RB, it indicates that the master RLC entity of the first RB is located in the second DU; or when the first indication information is for requesting to set up the split secondary RLC entity of the first RB, it indicates that the master RLC entity of the first RB is located in the first DU. In an optional manner, the first indication information includes 1 bit. When a value of the bit is "0", it indicates that the first indication information is for requesting to set up the master RLC entity of the first RB; or when a value of the bit is "1", it indicates that the first indication information is for requesting to set up the split secondary RLC entity of the first RB. Alternatively, when a value of the bit is "1", it indicates that the first indication information is for requesting to set up the master RLC entity of the first RB; or when a value of the bit is "0", it indicates that the first indication information is for requesting to set up the split secondary RLC entity of the first RB.

Optionally, the CU further sends third indication information to the second DU. Accordingly, the second DU receives the third indication information from the CU. For descriptions of the third indication information, refer to step S801. Details are not described herein again.

After receiving the first indication information, the second DU sends fourth indication information to the CU. Accordingly, the CU receives the fourth indication information from the second DU. For descriptions of the fourth indication information, refer to step S801. Details are not described herein again.

S802: The CU sends fifth indication information to the terminal device. Accordingly, the terminal device receives the fifth indication information from the CU. For specific descriptions of the fifth indication information, refer to the descriptions of the fifth indication information in step S602.

S803: The second DU sends second indication information to the terminal device. Accordingly, the terminal device receives the second indication information from the second DU. The second indication information indicates a status of each secondary RLC entity of all secondary RLC entities associated with the first RB. For specific descriptions of the second indication information, refer to step S503 in the embodiment shown in FIG. 5. Only the "secondary network device" in step S501 needs to be replaced with the first DU, and only the "master network device" needs to be replaced with the CU. Details are not described herein again.

The foregoing embodiment provides a data transmission method. When more than two RLC entities (or logical channels) are configured for a radio bearer, the second DU receives indication information from the CU. The second DU may determine, based on the indication information, a master RLC entity associated with the radio bearer, to accurately indicate, to the terminal device, RLC entities that need to be activated and deactivated, thereby improving data transmission reliability.

It may be understood that, to implement the functions in the foregoing embodiments, the network device and the terminal device include corresponding hardware structures and/or software modules for performing the functions. A person skilled in the art should easily be aware that, in combination with the units and the method steps in the examples described in embodiments disclosed in this application, this application can be implemented by hardware, software, or a combination of hardware and software. Whether a function is performed by hardware, software, or hardware driven by computer software depends on particular application scenarios and design constraints of the technical solutions.

Figure 9:
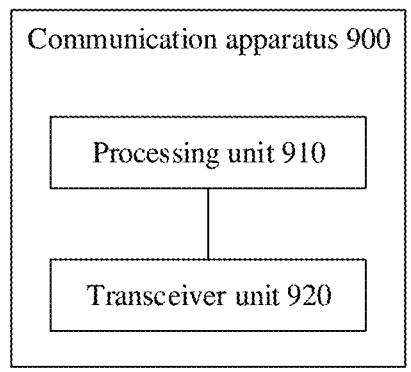
FIG. 9 and FIG. 10 are schematic diagrams of possible structures of communication apparatuses according to embodiments of this application.
Figure 10:
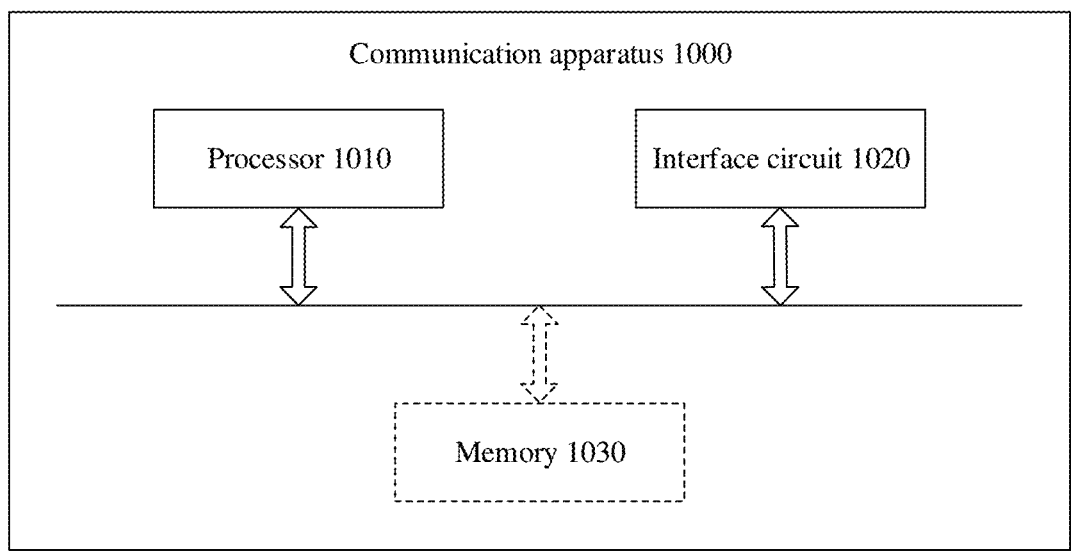

FIG. 9 and FIG. 10 are schematic diagrams of possible structures of communication apparatuses according to embodiments of this application. The communication apparatus may be configured to implement the function of the terminal device or the network device in the foregoing method embodiments. Therefore, beneficial effects of the foregoing method embodiments can also be implemented. In this embodiment of this application, the communication apparatus may be the secondary network device 120 shown in FIG. 1, the master network device 130 shown in FIG. 1, or a module (for example, a chip) applied to a secondary network device or a master network device.

As shown in FIG. 9, a communication apparatus 900 includes a processing unit 910 and a transceiver unit 920. The communication apparatus 900 is configured to implement the function of the secondary network device or the master network device in the method embodiments shown in FIG. 5 and FIG. 6. Alternatively, the communication apparatus 900 is configured to implement the function of the first DU or the second DU in the method embodiments shown in FIG. 7 and FIG. 8.

When the communication apparatus 900 is configured to implement the function of the secondary network device in the method embodiment shown in FIG. 5, the transceiver unit 920 is configured to receive first indication information from a master network device, where the first indication information indicates a master radio link control RLC entity of a first radio bearer RB, and the first RB is associated with one master RLC entity and a maximum of three secondary RLC entities; and the transceiver unit 920 is further configured to send second indication information with a length of 3 bits to a terminal device, where the second indication information indicates a status of each secondary RLC entity associated with the first RB, and different secondary RLC entities associated with the first RB correspond to different bits in the 3 bits.

When the communication apparatus 900 is configured to implement the function of the master network device in the method embodiment shown in FIG. 5, the transceiver unit 920 is configured to send first indication information to a secondary network device, where the first indication information indicates a master radio link control RLC entity of a first radio bearer RB, and the first RB is associated with one master RLC entity and a maximum of three secondary RLC entities; and the transceiver unit 920 is further configured to send fifth indication information to a terminal device, where the fifth indication information indicates the master RLC entity of the first RB.

When the communication apparatus 900 is configured to implement the function of the secondary network device in the method embodiment shown in FIG. 6, the transceiver unit 920 is configured to send first indication information to a master network device, where the first indication information indicates a master radio link control RLC entity of a first radio bearer RB, and the first RB is associated with one master RLC entity and a maximum of three secondary RLC entities; and the transceiver unit 920 is further configured to send fifth indication information to a terminal device, where the fifth indication information indicates the master RLC entity of the first RB.

When the communication apparatus 900 is configured to implement the function of the master network device in the method embodiment shown in FIG. 6, the transceiver unit 920 is configured to receive first indication information from a secondary network device, where the first indication information indicates a master radio link control RLC entity of a first radio bearer RB, and the first RB is associated with one master RLC entity and a maximum of three secondary RLC entities; and the transceiver unit 920 is further configured to send second indication information with a length of 3 bits to a terminal device, where the second indication information indicates a status of each secondary RLC entity associated with the first RB, and different secondary RLC entities associated with the first RB correspond to different bits in the 3 bits.

When the communication apparatus 900 is configured to implement the function of the first DU in the method embodiment shown in FIG. 7, the transceiver unit 920 is configured to receive first indication information from a CU, where the first indication information indicates a master radio link control RLC entity of a first radio bearer RB, and the first RB is associated with one master RLC entity and a maximum of three secondary RLC entities; and the transceiver unit 920 is further configured to send second indication information with a length of 3 bits to a terminal device, where the second indication information indicates a status of each secondary RLC entity associated with the first RB, and different secondary RLC entities associated with the first RB correspond to different bits in the 3 bits.

When the communication apparatus 900 is configured to implement the function of the CU in the method embodiment shown in FIG. 7, the transceiver unit 920 is configured to send first indication information to a first DU, where the first indication information indicates a master radio link control RLC entity of a first radio bearer RB, and the first RB is associated with one master RLC entity and a maximum of three secondary RLC entities; and the transceiver unit 920 is further configured to send fifth indication information to a terminal device, where the fifth indication information indicates the master RLC entity of the first RB.

When the communication apparatus 900 is configured to implement the function of the second DU in the method embodiment shown in FIG. 8, the transceiver unit 920 is configured to receive first indication information from a CU, where the first indication information indicates a master radio link control RLC entity of a first radio bearer RB, and the first RB is associated with one master RLC entity and a maximum of three secondary RLC entities; and the transceiver unit 920 is further configured to send second indication information with a length of 3 bits to a terminal device, where the second indication information indicates a status of each secondary RLC entity associated with the first RB, and different secondary RLC entities associated with the first RB correspond to different bits in the 3 bits.

When the communication apparatus 900 is configured to implement the function of the CU in the method embodiment shown in FIG. 8, the transceiver unit 920 is configured to send first indication information to a second DU, where the first indication information indicates a master radio link control RLC entity of a first radio bearer RB, and the first RB is associated with one master RLC entity and a maximum of three secondary RLC entities; and the transceiver unit 920 is further configured to send fifth indication information to a terminal device, where the fifth indication information indicates the master RLC entity of the first RB.

For more detailed descriptions of the processing unit 910 and the transceiver unit 920, directly refer to related descriptions in the method embodiments shown in FIG. 5 to FIG. 8. Details are not described herein again.

As shown in FIG. 10, a communication apparatus 1000 includes a processor 1010 and an interface circuit 1020. The processor 1010 and the interface circuit 1020 are coupled to each other. It may be understood that the interface circuit 1020 may be a transceiver or an input/output interface. Optionally, the communication apparatus 1000 may further include a memory 1030, configured to store instructions executed by the processor 1010, input data required for running instructions by the processor 1010, or data generated after the processor 1010 runs instructions.

When the communication apparatus 1000 is configured to implement the methods shown in FIG. 5 to FIG. 8, the processor 1010 is configured to implement the functions of the processing unit 910, and the interface circuit 1020 is configured to implement the functions of the transceiver unit 920.

When the communication apparatus is a chip applied to a terminal device, the chip in the terminal device implements the functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements the functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in this embodiment of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor or the like.

In embodiments of this application, the processor may be a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or a storage medium in any other form well-known in the art. For example, a storage medium is coupled to a processor, so that the processor can read information from the storage medium or write information into the storage medium. Certainly, the storage medium may alternatively be a component of the processor. The processor and the storage medium may be disposed in an ASIC. In addition, the ASIC may be located in a network device or a terminal device. Certainly, the processor and the storage medium may alternatively exist in the network device or the terminal device as discrete components.

All or a part of the foregoing embodiments may be implemented by using software, hardware, firmware, or any combination thereof. When software is used to implement embodiments, all or a part of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, a terminal device, or another programmable apparatus. The computer programs or the instructions may be stored in a computer-readable storage medium, or may be transmitted through a computer-readable storage medium. The computer-readable storage medium may be any usable medium accessible by the computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

In embodiments of this application, unless there is a particular description or a logical conflict, terms and/or descriptions in different embodiments are consistent and may be mutually referenced. Technical features in the different embodiments may be combined based on their internal logical relationship, to form a new embodiment.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A secondary network device, comprising:
   at least one processor; and
   a non-transitory memory coupled to the at least one processor and configured to store executable instructions that are executable by the at least one processor, the executable instructions including instructions to:
   receive an s-node addition request message or an s-node modification request message from a master network device, wherein the s-node addition request message or the s-node modification request message comprises configuration information, first indication information, and third indication information, the configuration information indicates that a first radio bearer (RB) is associated with M radio link control (RLC) entities of the secondary network device, M is 1, 2, or 3, a value of two bits comprised in the configuration information is M, the first indication information indicates whether there is a master RLC entity in the M RLC entities, the third indication information comprises identifiers of any secondary RLC entities and master RLC entity that are associated with the first RB in the master network device, and the first RB is associated with one master RLC entity and a maximum of three secondary RLC entities; and
   send second indication information having a length of 3 bits to a terminal device, wherein the second indication information indicates a status of each secondary RLC entity associated with the first RB, and different secondary RLC entities associated with the first RB correspond to different bits in the 3 bits.

2. The secondary network device according to claim 1, wherein the second indication information is carried in a media access control (MAC) control element.

3. The secondary network device according to claim 1, wherein, for each bit of the three bits, a correspondence between the respective bit and a secondary RLC entity associated with the first RB is preset.

4. The secondary network device according to claim 3, wherein, for each bit of the 3 bits, when a value of the bit is 1, a status of a secondary RLC entity corresponding to the bit is an active state, or a status of a logical channel associated with a secondary RLC entity corresponding to the bit is an active state.

5. The secondary network device according to claim 1, wherein the executable instructions further instruct the at least one processor to:
   when the master RLC entity associated with the first RB is an RLC entity of the secondary network device, send fourth indication information to the master network device, wherein the fourth indication information indicates an identifier of a logical channel associated with the master RLC entity associated with the first RB.

6. The secondary network device according to claim 5, wherein the fourth indication information is carried in an s-node addition request acknowledge message or an s-node modification request acknowledge message.

7. A method, applied to a second communication apparatus, wherein the second communication apparatus is a master network device or a chip in a master network device, and the method comprises:
   sending an s-node addition request message or an s-node modification request message to a secondary network device, wherein the s-node addition request message or the s-node modification request message comprises configuration information, first indication information, and third indication information, the configuration information indicates that a first radio bearer (RB) is associated with M radio link control (RLC) entities of the secondary network device, M is 1, 2, or 3, a value of two bits comprised in the configuration information is M, the first indication information indicates whether there is a master RLC entity in the M RLC entities, the third indication information comprises identifiers of any secondary RLC entities and master RLC entity that are associated with the first RB in the master network device, and the first RB is associated with one master RLC entity and a maximum of three secondary RLC entities; and
   sending fifth indication information to a terminal device, wherein the fifth indication information indicates the master RLC entity of the first RB.

8. The method according to claim 7, wherein the fifth indication information is carried in a radio resource control (RRC) reconfiguration message.

9. The method according to claim 7, wherein that the fifth indication information indicates the master RLC entity of the first RB comprises:
   the fifth indication information indicates an index of the master RLC entity associated with the first RB, or the fifth indication information indicates an identifier of a logical channel associated with the master RLC entity associated with the first RB.

10. The method according to claim 7, wherein the fifth indication information further indicates initial statuses of all secondary RLC entities associated with the first RB.

11. The method according to claim 7, wherein the fifth indication information further indicates:
    an identifier of a split secondary RLC entity associated with the first RB; or
    an identifier of a logical channel associated with a split secondary RLC entity associated with the first RB.

12. The method according to claim 7, further comprising:
    when the master RLC entity associated with the first RB is an RLC entity of the secondary network device, receiving fourth indication information from the secondary network device, wherein the fourth indication information indicates an identifier of the master RLC entity associated with the first RB.

13. The method according to claim 12, wherein the fourth indication information is carried in an s-node addition request acknowledge message or an s-node modification request acknowledge message.

14. A communication system, comprising:
    a secondary network device; and
    a master network device;

wherein the secondary network device is configured to:
  receive an s-node addition request message or an s-node modification request message from the master network device, wherein the s-node addition request message or the s-node modification request message comprises configuration information, first indication information, and third indication information, the configuration information indicates that a first radio bearer (RB) is associated with M radio link control (RLC) entities of the secondary network device, M is 1, 2, or 3, a value of two bits comprised in the configuration information is M, the first indication information indicates whether there is a master RLC entity in the M RLC entities, the third indication information comprises identifiers of any secondary RLC entities and master RLC entity that are associated with the first RB in the master network device, and the first RB is associated with one master RLC entity and a maximum of three secondary RLC entities; and
  send second indication information having a length of 3 bits to a terminal device, wherein the second indication information indicates a status of each secondary RLC entity associated with the first RB, and different secondary RLC entities associated with the first RB correspond to different bits in the 3 bits; and
wherein the master network device is configured to:
  send the s-node addition request message or the s-node modification request message to the secondary network device; and
  send fifth indication information to a terminal device, wherein the fifth indication information indicates the master RLC entity of the first RB.

15. The system according to claim 14, wherein for each bit of the 3 bits, a correspondence between the bit and a secondary RLC entity associated with the first RB is preset.

16. The system according to claim 14, wherein the secondary network device is further configured to:
  when the master RLC entity associated with the first RB is an RLC entity of the secondary network device, send fourth indication information to the master network device, wherein the fourth indication information indicates an identifier of a logical channel associated with the master RLC entity associated with the first RB.

17. The system according to claim 14, wherein the fifth indication information is carried in a radio resource control (RRC) reconfiguration message.

18. The system according to claim 14, wherein that the fifth indication information indicates the master RLC entity of the first RB comprises:
  the fifth indication information indicates an index of the master RLC entity associated with the first RB; or
  the fifth indication information indicates an identifier of a logical channel associated with the master RLC entity associated with the first RB.

19. The system according to claim 14, wherein the fifth indication information further indicates initial statuses of all secondary RLC entities associated with the first RB.

20. The system according to claim 14, wherein the fifth indication information further indicates an identifier of a split secondary RLC entity associated with the first RB or an identifier of a logical channel associated with a split secondary RLC entity associated with the first RB.

* * * * *